(12) United States Patent  
van Antwerpen et al.

(10) Patent No.: US 7,120,883 B1  
(45) Date of Patent: Oct. 10, 2006

(54) REGISTER RETIMING TECHNIQUE

(75) Inventors: Babette van Antwerpen, Mountain View, CA (US); Michael D. Hutton, Mountain View, CA (US); Gregg Baeckler, San Jose, CA (US); Richard Yuan, Cupertino, CA (US)

(73) Assignee: Altera Corporation, San Jose, CA (US)

( * ) Notice: Subject to any disclaimer, the term of this patent is extended or adjusted under 35 U.S.C. 154(b) by 55 days.

(21) Appl. No.: 10/446,650

(22) Filed: May 27, 2003

(51) Int. Cl.
*G06F 17/50* (2006.01)

(52) U.S. Cl. .................................. 716/6; 716/1; 716/18

(58) Field of Classification Search ................ 716/1–6, 716/16–18
See application file for complete search history.

(56) References Cited

U.S. PATENT DOCUMENTS

| 5,822,217 | A | * | 10/1998 | Shenoy ........................... 716/6 |
| 5,838,954 | A | * | 11/1998 | Trimberger .................... 716/16 |
| 2003/0126580 | A1 | * | 7/2003 | Kurokawa et al. ............. 716/18 |
| 2003/0182638 | A1 | * | 9/2003 | Gupta et al. .................... 716/4 |
| 2004/0225970 | A1 | * | 11/2004 | Oktem ............................ 716/1 |

OTHER PUBLICATIONS

J. Cong, H. Li and C. Wu. Simultaneous Circuit Partitioning/Clustering with Retiming for Performance Optimization. In Proc. *Design Automation Conference (DAC)*, pp. 460-465, 1999.

K Eckl, J.C. Madre, P. Zepter and C. Legl. "A Practical Approach to Multiple-Class Retiming". In Proc. *Design Automation Conference (DAC)*, 1999.

G. Even, I.Y. Spillinger and L. Stock. "Retiming Revisited and Reversed." *IEEE Trans. on Computer Aided Design of Integrated Circuits and Systems*, vol. 15, No. 3, pp. 348-357, 1996.

C.E. Leiserson and J.B. Saxe. "Retiming Synchronous Circuitry". *Algorithmica*, 1991.

P. Pan. "Performance-Driven Integration of Retiming and Resynthesis". In Proc. *Design Automation Conference (DAC)*, pp. 247-252, 1999.

N. Shenoy and R. Rudell. "Efficient Implementation of Retiming". In Proc. *Int'l Conference on Computer-Aided Design (ICCAD)*. 1994.

J. Cong, Y.Y. Hwang. "Structural Gate-Decomposition for Depth-Optimal Technology Mapping in LUT-Based FPGA Design." In Proc. Design Automation Conference (DAC). 1996.

J. Cong, S.K. Lim and C. Wu. "Performance Driven Multi-level and Multiway Partitioning with Retiming", in Proc. Design Automation Conference (DAC), pp. 274-279, 2000.

J. Cong and S.K. Lim. "Physical Planning with Retiming." In Proc. Int'l Conference on Computer-Aided Design (ICCAD), pp. 2-7, 2000.

(Continued)

*Primary Examiner*—Paul Dinh
(74) *Attorney, Agent, or Firm*—Townsend and Townsend and Crew, LLP

(57) ABSTRACT

An electronic automation system performs register retiming on a logic design, which may be a logic design for a programmable logic integrated circuit. Register retiming is a moving or rearranging of registers across combinatorial logic in a design in order to improve a maximum operating frequency or fmax. In one implementation, the system includes machine-readable code, which may be stored on a computer-readable medium such as a disk, executing on a computer. The system balances timing in order to trade off delays between critical and noncritical paths. Register retiming may make changes to a design at a gate level.

6 Claims, 14 Drawing Sheets

OTHER PUBLICATIONS

J. Cong and C. Wu. "An Efficient Algorithm for Performance Optimal FPGA Technology Mapping with Retiming". IEEE Transactions on Computer Aided Design of Circuits and Systems, vol. 17, No. 9, pp. 738-748, 1998.

J. Cong and C. Wu. "Optimal FPGA Mapping and Retiming with Efficient Initial State Computation"., IEEE Trans. on Computer Aided Design of Integrated Circuits and Systems, vol. 18, No. 11, pp. 1595-1607, 1999.

C. Legl, P. Vanbekbergen, A. Wang. "Retiming of Edge-Triggered Circuits with Multiple Clocks and Load Enables". In Proc. Int'l workshop on Logic Synthesis (IWLS), 1997.

D. Lewis et al. "The Stratix Routing and Logic Architecture". Submitted to FPGA 2003.

N. Maheshwari and S. Sapatnekar. "Efficient Retiming of Large Circuits." IEEE Transactions on VLSI Systems, vol. 6, No. 1, pp. 74-83, 1998.

N. Maheshwari and S. Sapatnekar. "Minimum Area Retiming with Equivalent Initial States." In Proc. Int'l Conference on Computer-Aided Design (ICCAD). 1997.

P. Pan and C.C. Lin. A New Retiming-Based Technology Mapping Algorithm for LUT-Based FPGAs. In Proc. ACM/IEEE Int'l Conference on FPGAs (FPGA), 1998.

P. Pan and C.L. Liu. "Optimal Clock Period FPGA Technology Mapping for Sequential Circuits:" ACM Transactions on Design Automation of Electronic Systems, vol. 3, No. 3, 1998.

H.J. Touati and R.K. Brayton. "Computing the Initial States of Retimed Circuits", IEEE Trans. on Computer-Aided Design, vol. 12, No. 1, pp. 157-162, 1993.

D.P. Singh, S.D. Brown. "Integrated Retiming and Placement for Field Programmable Gate Arrays." In Proc. ACM/IEEE Int'l Conference on FPGAs (FPGA), 2001.

H Zhou, V. Singhal and A. Aziz. "How powerful is retiming?" In Proc. IEEE/ACM Int'l Workshop on Logic Synthesis (IWLS), 1998.

Klaus Eckl, et al.; A Practical Approach to Multiple-Class Retiming; Proceedings 1999 Design Automation Conference (Cat. No. 99CH36361); Jun. 21-25, 2005; p. 237-42; IEEE, Piscataway, NJ, USA.

* cited by examiner

REGISTER RETIMING TECHNIQUE

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

COMPUTER PROGRAM LISTING APPENDIX

A computer program listing appendix is submitted with this patent document by compact disc (CD-R). There are two compact discs, an original and its duplicate, and all material on the compact discs is incorporated by reference. Each compact disc includes a computer pseudocode listing of an embodiment of the invention in a file named retime.txt having 18,803 bytes, dated May 22, 2003.

BACKGROUND OF THE INVENTION

The present invention relates to the area of electronic design automation of logic design and in particular, to an aspect of optimizing a logic design known as register retiming.

Integrated circuits are important building blocks of the modern age. Technology continues to evolve and integrated circuits continue to provide improved functionality. As integrated circuits improve, so do the electronic systems that are built using integrated circuits. There are many types of integrated circuit such as memories, microprocessors, application specific integrated circuits (ASICs), and programmable logic. Programmable logic integrated circuits such as PALs, PLDs, FPGAs, LCAs, and others are becoming more complex and continually evolving to provide more user-programmable features on a single integrated circuit. Modern programmable logic integrated circuits incorporate programmable logic including logic gates, products terms, or look-up tables. Programmable logic integrated circuits also included embedded functionality such as user-programmable memory or RAM, digital signal processors (DSPs), and on-board microcontrollers such as ARM-based or MIPS-based controllers.

As integrated circuits become more complex and provide more functionality in a smaller die size, it also becomes increasingly difficult to ensure the logic functions are implemented properly and in an optimal way. Modern digital integrated circuits have many transistors and many logic gates, more so than can be optimized manually in a reasonable amount of time, especially when time-to-market is critical in ensuring a product's success. As a specific example, a typical programmable logic design today surpasses the multimillion-gate mark.

Computer aided design (CAD) and electronic design automation (EDA) tools are available to assist engineers with the design and verification tasks. These tools are especially helpful for complex logic designs. But even with the help of computer-aided tools, the process of optimizing an integrated circuit design can be time-consuming because of the large number of variables involved. It is desirable that the design automation task is done time efficiently even for large designs. Further, it is desirable the design automation tool maximizes performance or otherwise improve an aspect of an integrated circuit design. Some other aspects of a design that a tool may help with include improving critical path performance, removing metastability, reducing the number of logic gates used, checking or verifying functionality, removing race conditions, and others.

A specific performance measure in a design is fmax or FMAX, which is the maximum clock frequency which the integrated circuit can operate before logic errors will occur. It is desirable to optimize a logic design to provide the highest fmax frequency possible or equivalently, minimize the longest delay path. A logic design having registered or sequential logic may have logic paths where there can be increase in fmax frequency by rearranging the logic, such as register retiming. When improving the fmax, it is desirable that the equivalent or same functionality is provided as the original logic design, metastability is not introduced into the design, and the improved design is logical legal. It is important to be careful when implementing retiming because retiming can be a relatively dangerous operation in a synthesis flow due to its effects on simulation, verification and debug, and other issues such as metastability, and because a timing visibility early in a CAD flow is typically significantly less than desired.

As can be appreciated, there is a need to provide an electronic design automation system to evaluate and then improve the performance of an integrated circuit design, and in particular to provide retiming to improve the fmax frequency of a sign. This system may be specially suited to handling designs for programmable logic.

SUMMARY OF THE INVENTION

The present invention is an electronic automation system or method of performing register retiming on a logic design. Register retiming is a moving or rearranging of registers across combinatorial logic in a design in order to improve a maximum operating frequency or fmax. In one implementation, the system includes machine-readable code, which may be stored on a computer-readable medium such as a disk, executing on a computer. The system balances timing in order to trade off delays between critical and noncritical paths.

Retiming is a concept of improving performance of a design for an integrated circuit such as programmable logic. Since a key metric of performance in a logic design is the length of the longest paths, the concept of retiming is to move one or more registers in order to balance the lengths of longer paths and shorter paths, thus decreasing the worst-case delay. Retiming can be applied at multiple points in CAD design flow. In a specific embodiment retiming is part of a synthesis step, which is described in more detail below. However, one could easily apply the techniques to an algorithm which operates during other steps of the CAD flow.

The retiming technique of the invention is computationally efficient. The technique of the invention avoids some of the undesirable properties which other algorithms may cause in general, and specifically for PLDs and FPGAs. Specifically, the present algorithm guarantees not to introduce metastability conditions into the resulting logic design, has the ability to allow or disallow tradeoffs between logically unrelated clock domains or asynchronous paths which might otherwise change the intended behavior of the logic. The present algorithm is amenable to user direction to prohibit moves on certain logic cells which are required for simulation purposes or debug purposes by the user.

In a design flow of the invention, the method includes gate synthesis, retiming, technology mapping, and then place and route. In an alternative design flow, the method includes unmap, retiming, remap, and place and route. In an implementation of the invention, the method addresses issues including register compatibility due to secondary signals, "don't touch" constraints, common programmable logic or FPGA hardware such as RAM and carry chains and various illegal forms of register moves.

In a specific implementation of a method the invention for programmable logic, gate-level register retiming options will only move registers across combinational gates. Unless requested or permitted by a user, registers will not be moved across logic cell or LCELL primitives instantiated by the user, memory blocks, DSP block, or carry/cascade chains that have been instantiated. In an implementation, carry/cascade chains are left intact when using register retiming.

According to another aspect of the invention, the method of register retiming has the ability to move registers from the inputs of a combinational logic block to the output, potentially combining the registers. In this case, some registers are removed, and one is created at the output. Some design conditions specifying when registers can be moved and combined are: All registers have the same clock domain. All register have the same clock enable. All registers have asynchronous control signals that are active under the same conditions. If multiple registers have an asynchronous load other than VCC or ground, they will have the same asynchronous load.

In an embodiment, it is possible to create multiple registers at the input of a combinational block from a register at the output of a combinational block. In this case, the new registers will have the same clock and clock enable. The asynchronous control signals and power-up level will be derived form previous registers to provide equivalent functionality.

In an embodiment, the method of the invention permits a user to select an option to "never allow" for registers such that they are never moved during register retiming. This option can be applied either to individual registers or entities in the design. Other design conditions where register may not be moved include: Registers that have any timing constraint other than a global fmax, tsu, or tco. Registers that feed asynchronous control signals on another register. Registers feeding the clock of another register. Registers feeding a register in another clock domain. Registers connected to a serializer or deserializer (SERDES).

Other user selectable options may include an "allow register retiming to trade off tsu/tco with fmax" option. When this option is selected, it will be possible to increase fmax at the expense of tsu or tco times. Another option which may be used in conjunction with "allow register retiming to trade off tsu/tco with fmax" is "perform gate-level register retiming." The option "perform gate-level register retiming" controls whether retiming is performed at all. It is performed with the option is on, and not when the option is off. None of the other options have effect when off. There is on additional option "always allow" that can be set on a register or entity. If set, the register or registers are allowed to be moved even if one of the above described rules would have forbidden a move.

According to an aspect, the invention is a computer-aided design system and flow including design entry, synthesis, place and route, and timing analysis. Retiming is performed within the synthesis portion of the flow, before a technology mapping portion of the flow.

According to an aspect, the invention is a method executing in a computer-aided logic design system for designing logic circuitry, where the method performs register retiming by moving a register in a logic design across one or more delay elements of the design, the method includes: providing a logic design file incorporating the logic design in computer-readable format; finding in the logic design a design condition comprising a first register being clocked using an unrelated clock domain to a second register; and disallowing moving of the first and second register across delay elements when performing register retiming. A delay element may be combinational logic such as logic gates. A delay element may include at least one of a logic gate, AND, OR, XOR, NOR, NAND, INVERT, look-up table, RAM, or DSP block. The logic design file may be provided in a netlist format. The method may be application prior to physical implementation of the design into an integrated circuit.

According to another aspect, the invention is a method executing in a computer-aided logic design system for designing logic circuitry, where the method performs register retiming by moving a register in a logic design across one or more delay elements of the design, the method including: providing a logic design file incorporating the logic design in computer readable format; finding in the logic design a design condition including a first register having a data input directly fed by a pin; and disallowing moving of the first register across delay elements when performing register retiming.

According to other aspects of the invention, the design condition is replaced with a first register having an output directly feeding a pin. The design condition is replaced with a first register feeding an asynchronous signal to a second register. The design condition is replaced with a first register being clocked using a first clock domain and a second register being clocked using a second clock domain, different clock domain from the first clock domain. The design condition is replaced with a first register where a user has placed a timing constraint. The design condition is replaced with a first register where a user has indicated as "don't touch."

According to another aspect, the invention is a method executing in a computer-aided logic design system for designing logic circuitry, where the method performs register retiming by moving a register in a logic design across one or more delay elements of the design, the method including: providing a logic design file incorporating the logic design in computer readable format; providing a design condition where two registers are compatible if they have the same clock enable; determining whether a first register and a second register are compatible; and permitting forward retiming of the first and second register when the first and second registers are compatible. This aspect of the invention may be applicable to cases where there are more than two registers. Two is discussed merely as an example.

According to other aspects, two registers are compatible if they have their asynchronous signal triggered at the same time. Two registers are compatible if they have the same list of signals that trigger asynchronous events. Two registers are compatible if they have the same asynchronous signal load. Two registers are compatible if they have either the same asynchronous data or one has no asynchronous data. Two registers are compatible if they have their asynchronous signal triggered at the same time, and two registers are compatible if they have the same asynchronous signal load.

Other objects, features, and advantages of the present invention will become apparent upon consideration of the following detailed description and the accompanying drawings, in which like reference designations represent like features throughout the figures.

DETAILED DESCRIPTION OF THE INVENTION

Computer Aided Design System with Retiming

Figure 1A:
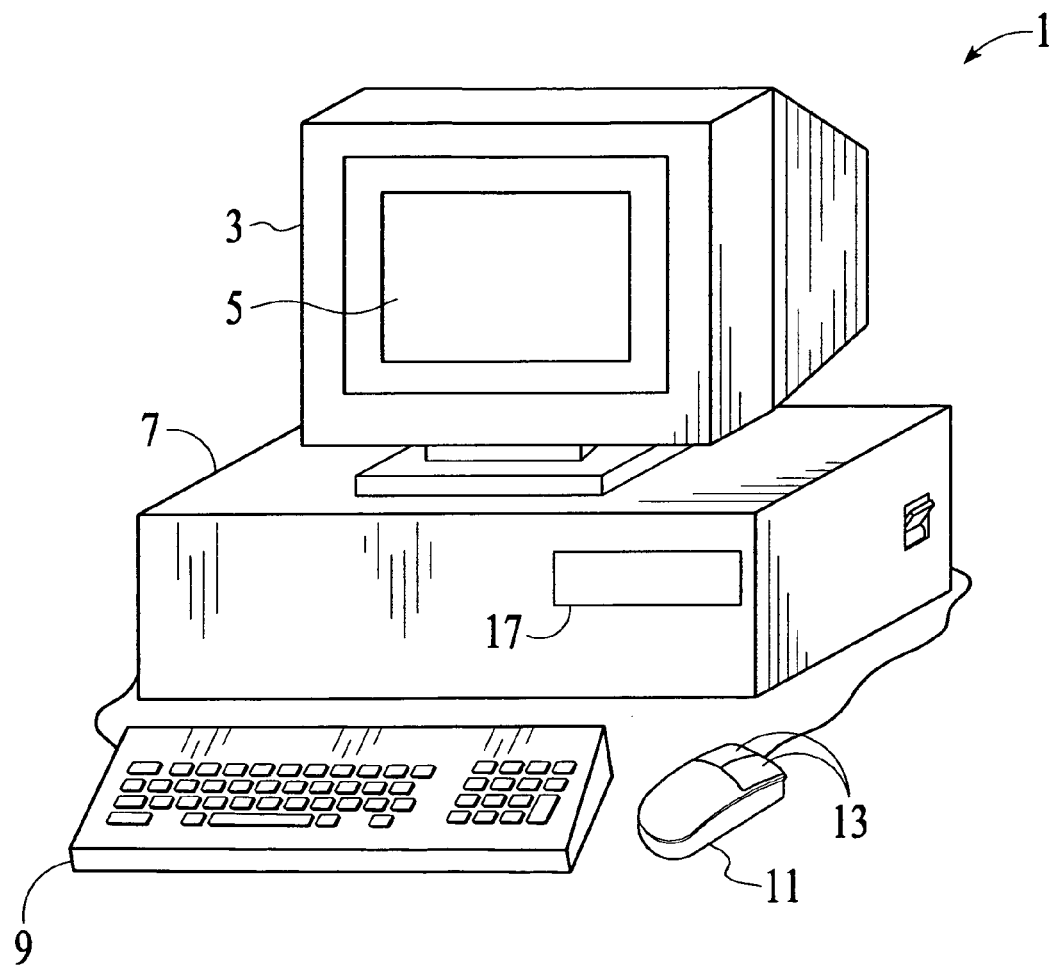
FIG. 1A shows an embodiment of a system of the invention.

FIG. 1A shows a system of the present invention for performing register retiming. In an embodiment, software of the invention executes on a computer workstation system, such as shown in FIG. 1A. FIG. 1A shows a computer system 1 that includes a monitor 3, screen 5, cabinet 7, keyboard 9, and mouse 11. Mouse 11 may have one or more buttons such as mouse buttons 13. Cabinet 07 houses familiar computer components, some of which are not shown, such as a processor, memory, mass storage devices 17, and the like. Mass storage devices 17 may include mass disk drives, floppy disks, Iomega ZIP™ disks, magnetic disks, fixed disks, hard disks, CD-ROMs, recordable CDs, DVDs, DVD-R, DVD-RW, Flash and other nonvolatile solid-state storage, tape storage, reader, and other similar media, and combinations of these. A binary, machine-executable version, of the software of the present invention may be stored or reside on mass storage devices 17. Furthermore, the source code of the software of the present invention may also be stored or reside on mass storage devices 17 (e.g., magnetic disk, tape, or CD-ROM).

Figure 1B:
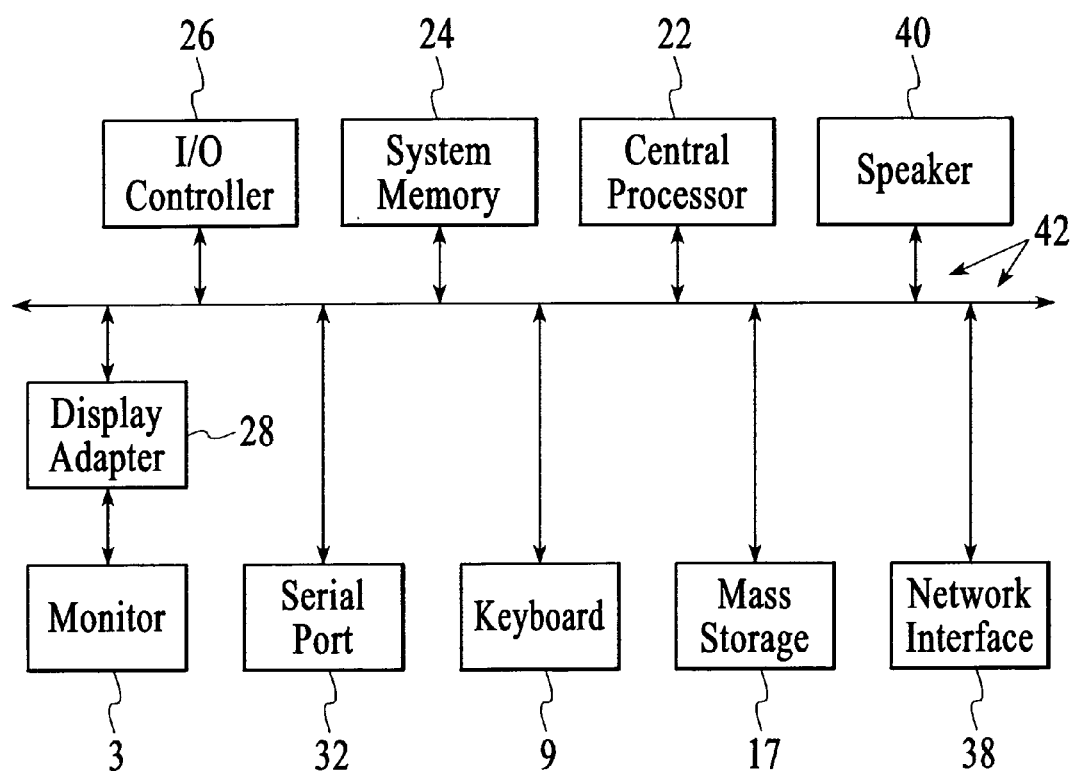
FIG. 1B shows a more detailed block diagram of the system of FIG. 1A.

Furthermore, FIG. 1B shows a system block diagram of computer system 1 used to execute the software of the present invention. As in FIG. 1A, computer system 1 includes monitor 3, keyboard 9, and mass storage devices 17. Computer system 1 further includes subsystems such as central processor 22, system memory 24, input/output (I/O) controller 26, display adapter 28, serial or universal serial bus (USB) port 32, network interface 38, and speaker 40. The invention may also be use with computer systems with additional or fewer subsystems. For example, a computer system could include more than one processor 22 (i.e., a multiprocessor system) or a system may include a cache memory.

Arrows such as 42 represent the system bus architecture of computer system 1. However, these arrows are illustrative of any interconnection scheme serving to link the subsystems. For example, speaker 40 could be connected to the other subsystems through a port or have an internal direct connection to central processor 22. Computer system 1 shown in FIG. 1A is but an example of a computer system suitable for use with the present invention. Other configurations of subsystems suitable for use with the present invention will be readily apparent to one of ordinary skill in the art.

Computer software products may be written in any of various suitable programming languages, such as C, C++, Pascal, Fortran, Perl, MatLab (from MathWorks, www.mathworks.com), SAS, SPSS, and Java. The computer software product may be an independent application with data input and data display modules. Alternatively, the computer software products may be classes that may be instantiated as distributed objects. The computer software products may also be component software such as Java Beans (from Sun Microsystem), Enterprise Java Beans (EJB from Sun Microsystems). An operating system for the system may be one of the Microsoft Windows® family of operating systems (e.g., Windows 95, 98, Me, Windows NT, Windows 2000, Windows XP), Linux, UNIX, or Sun OS.

Furthermore, the computer may be connected to a network and may interface to other computers using this network. For example, pattern recognition may be performed via distributed computer through this network, where each computer in the network performs part of the task of the many series of pattern recognition steps in parallel. Furthermore, the network may be an intranet, internet, or the Internet, among others. The network may be a wired network (e.g., using copper), telephone network, packet network, an optical network, or a wireless network. For example, data and other information may be passed between the computer and components (or steps) of a system of the invention using a wireless network using a protocol such as Wi-Fi (IEEE standard 802.11, 802.11a, 802.11b, 802.11g, and 802.11i to name a few examples). For example, signals from a computer may be transferred, at least in part, wirelessly to a programmable logic integrated circuit.

Figure 1C:
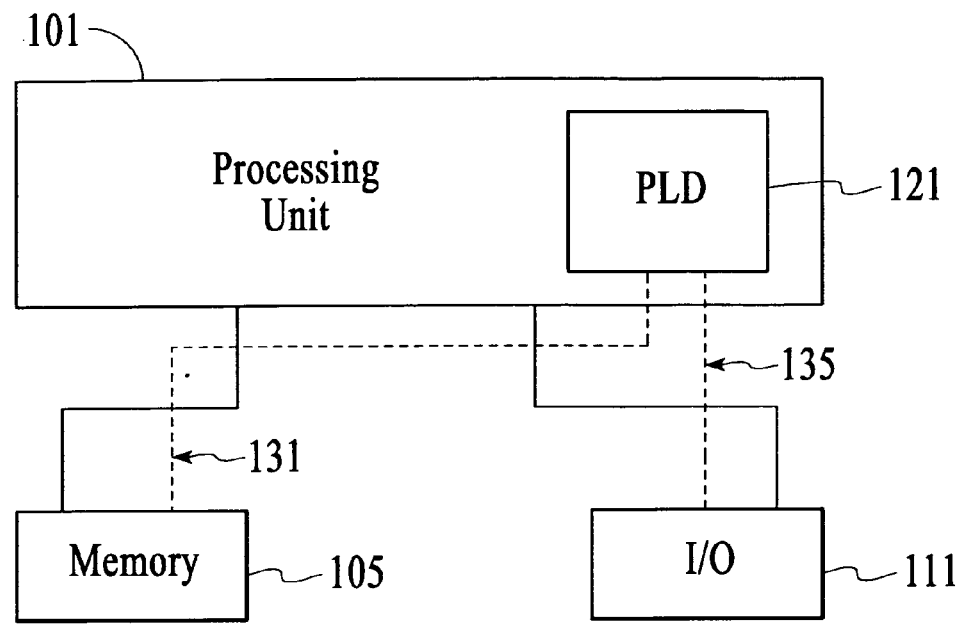
FIG. 1C is diagram of a digital system with a programmable logic integrated circuit.

FIG. 1C shows a block diagram of a digital system, which the system the invention may incorporate or operate on. The system may be provided on a single board, on multiple boards, or within multiple enclosures. Though embodiments of the present invention are useful in electronic and integrated circuits in general, they are particularly useful in programmable logic devices. FIG. 1C illustrates a system 101 in which such a programmable logic device 121 may be utilized. Programmable logic devices or programmable logic integrated circuits are sometimes referred to as a PALs, PLAs, FPLAs, PLDs, CPLDs, EPLDs, EEPLDs, LCAs, or FPGAs and are well-known integrated circuits that provide the advantages of fixed integrated circuits with the flexibility of custom integrated circuits. Such devices allow a user to electrically program standard, off-the-shelf logic elements to meet a user's specific needs and are sold, e.g., by Altera Corporation of San Jose, Calif. Programmable logic integrated circuits and their operation are well known to those of skill in the art.

In the particular embodiment of FIG. 1C, a processing unit 101 is coupled to a memory 105 and an I/O 111, and incorporates a programmable logic device 121. PLD 121 may be specially coupled to memory 105 through connection 131 and to I/O 111 through connection 135. The system may be a programmed digital computer system, digital signal processing system, specialized digital switching network, or other processing system. Moreover, such systems may be designed for a wide variety of applications such as, merely by way of example, telecommunications systems, automotive systems, control systems, consumer electronics, personal computers, Internet communications and networking, and others.

Processing unit 101 may direct data to an appropriate system component for processing or storage, execute a program stored in memory 105 or input using I/O 111, or other similar function. Processing unit 101 may be a central processing unit (CPU), microprocessor, floating point coprocessor, graphics coprocessor, hardware controller, microcontroller, programmable logic device programmed for use as a controller, network controller, or other processing unit. Furthermore, in many embodiments, there is often no need for a CPU. For example, instead of a CPU, one or more PLDs 121 may control the logical operations of the system. In an embodiment, PLD 121 acts as a reconfigurable processor, which can be reprogrammed as needed to handle a particular computing task. Alternately, programmable logic device 121 may include a processor. In some embodiments, processing unit 101 may even be a computer system. Memory 105 may be a random access memory (RAM), read only memory (ROM), fixed or flexible disk media, PC Card flash disk memory, tape, or any other storage retrieval means, or any combination of these storage retrieval means. PLD 121 may serve many different purposes within the system in FIG. 1. PLD 121 may be a logical building block of processing unit 101, supporting its internal and external operations. PLD 121 is programmed to implement the logical functions necessary to carry on its particular role in system operation.

Programmable Logic

Figure 2:
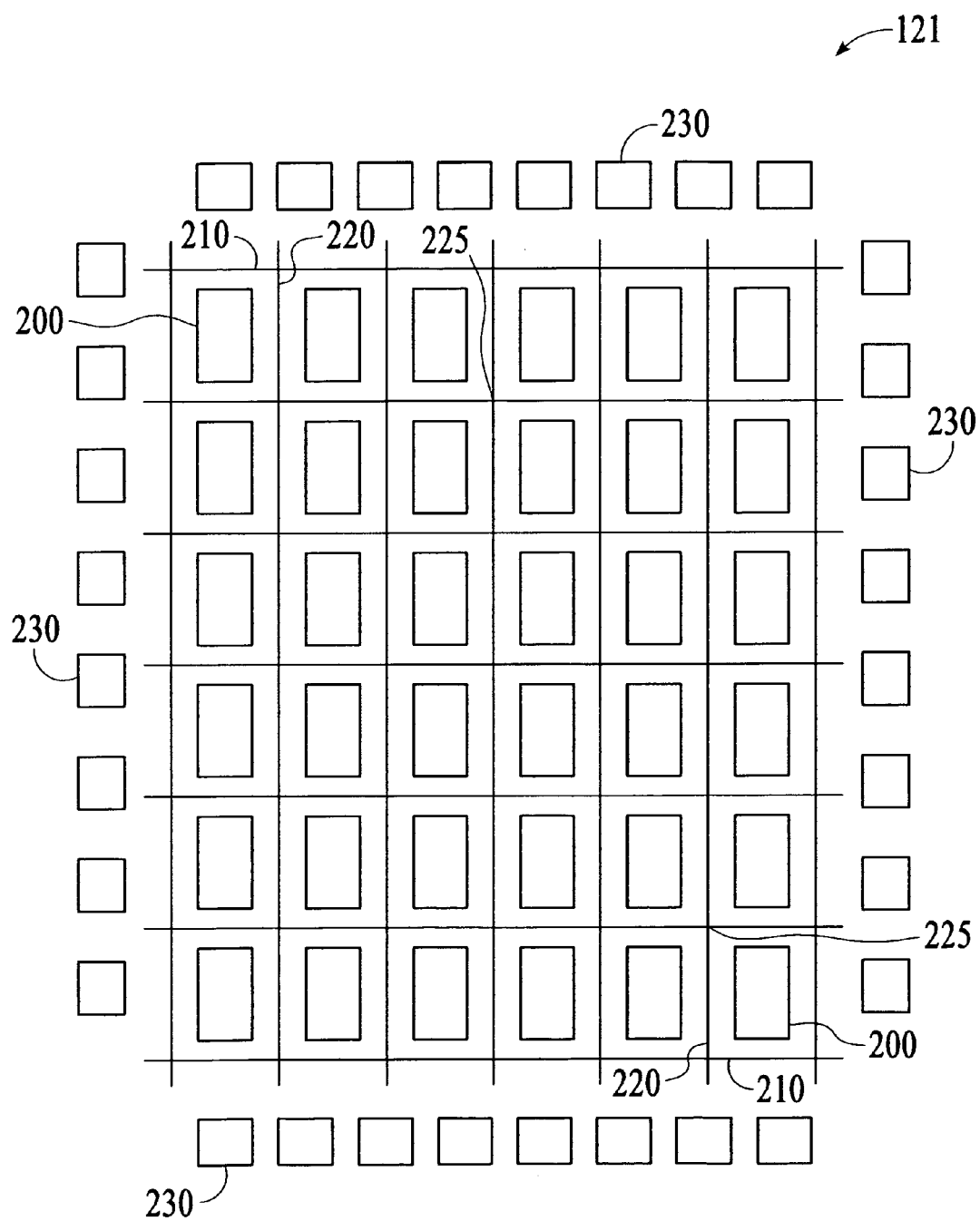
FIG. 2 is a diagram showing a floor plan of a programmable logic integrated circuit with an embedded processor.

FIG. 2 is a simplified block diagram of an overall internal architecture and organization of a PLD. Many details of programmable logic architecture, organization, and circuit design are not necessary for an understanding of the present invention and such details are not shown.

FIG. 2 shows a six-by-six two-dimensional array of thirty-six logic array blocks (LABs) 200. LAB 200 is a physically grouped set of logical resources that is configured or programmed to perform logical functions. The internal architecture of a LAB is described in more detail below. The programmable logic portion may contain any arbitrary number of LABs. Generally, in the future, as technology advances and improves, programmable logic devices with greater numbers of logic array blocks will undoubtedly be created. Furthermore, LABs 200 need not be organized in a square matrix or array; for example, the array may be organized in a five-by-seven or a twenty-by-seventy matrix of LABs.

LAB 200 has inputs and outputs (not shown) which may or may not be programmably connected to a global interconnect structure, comprising an array of horizontal interconnects 210 and vertical interconnects 220. Although shown as single lines in FIG. 2, each set of interconnect lines may represent a plurality of signal conductors. The inputs and outputs of LAB 200 are programmably connectable to these sets of interconnect lines, such that multiple LABs 200 may be connected and combined to implement larger, more complex logic functions than can be realized using a single LAB 200.

In other embodiments, the programmable logic integrated circuit may include special or segmented interconnect that is connected to a specific number of LABs and not necessarily an entire row or column of LABs. For example, the segmented interconnect may programmably connect two, three, four, five, or more LABs.

The programmable logic architecture in FIG. 2 further shows at the peripheries of the chip, input and output circuits 230. Input and output circuits 230 are for interfacing the PLD to external, off-chip circuitry. Some or all of these input and output circuits 230 may be consistent with embodiments of the present invention. FIG. 2 shows thirty-two input and output circuits 230; however, a programmable logic integrated circuit may contain any number of input and output circuits, more or less than the number depicted. As discussed above, some of these input-output drivers may be shared between the embedded processor and programmable logic portions. Each input and output circuit 230 is configurable for use as an input driver, output driver, or bidirectional driver. In other embodiments of a programmable logic integrated circuit, the input and output circuits may be embedded with the integrated circuit core itself. This embedded placement of the input and output circuits may be used with flip chip packaging and will minimize the parasitics of routing the signals to input and output circuits.

Figure 3:
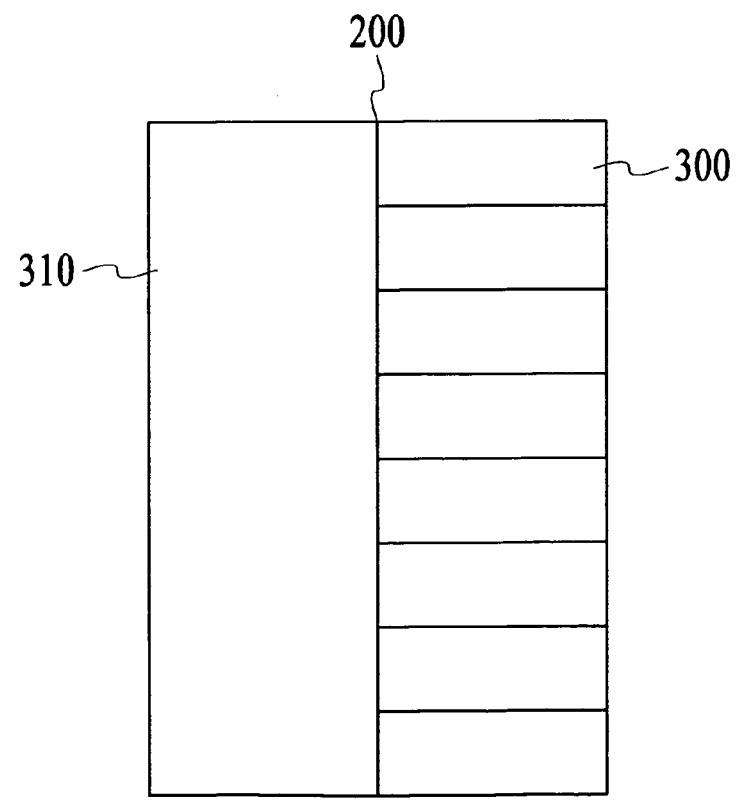
FIG. 3 is a diagram showing the programmable logic portion of the programmable logic integrated circuit.

FIG. 3 shows a simplified block diagram of LAB 200 of FIG. 2. LAB 200 is comprised of a varying number of logic elements (LEs) 300, sometimes referred to as "logic cells" or LCELLS, and a local (or internal) interconnect structure 310. LAB 200 has eight LEs 300, but LAB 200 may have any number of LEs, more or less than eight.

A general overview of LE 300 is presented here, sufficient to provide a basic understanding of the present invention. LE 300 is the smallest logical building block of a PLD. Signals external to the LAB are connectable to LE 300 through local interconnect structure 310. In one embodiment, LE 300 incorporates a function generator that is configurable to provide a logical function of a number of variables, such a four-variable Boolean operation. As well as combinatorial functions, LE 300 also provides support for sequential and registered functions using, for example, D flip-flops. For example, a logic element includes combinational and sequential blocks. The combinational blocks may be implemented using product terms or a look-up table, as a couple of examples. The sequential block may be a flip-flop, D flip-flop, or register.

LE 300 provides combinatorial and registered outputs that are connectable to the interconnect lines 210 and 220, outside LAB 200. Furthermore, the outputs from LE 300 may be internally fed back into local interconnect structure 310; through local interconnect structure 310, an output from one LE 300 may be programmably connected to the inputs of other LEs 300, without using the global interconnect structure.

Figure 4:
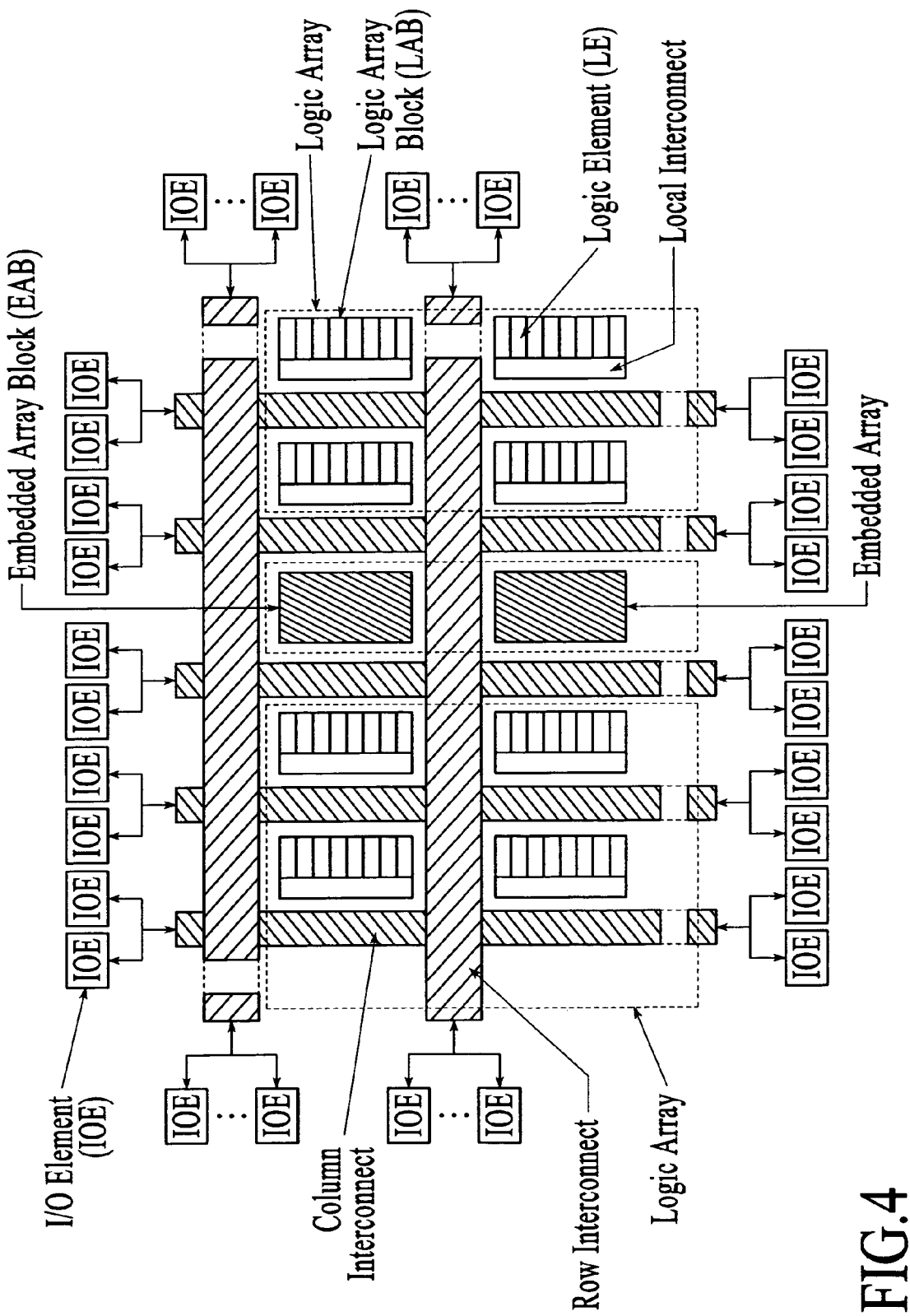
FIG. 4 is a simplified block diagram of a logic array block (LAB).

FIG. 4 shows a programmable logic architecture. The architecture in FIG. 4 further includes embedded array blocks (EABs). EABs contain user memory, a flexible block of RAM. The embedded array blocks can be configured as FIFOs acting as frequency translators and serial to parallel converters for interfacing between high-speed input and outputs and the core circuits including the logic array blocks.

Computer Aided Design Flow

Figure 5A:
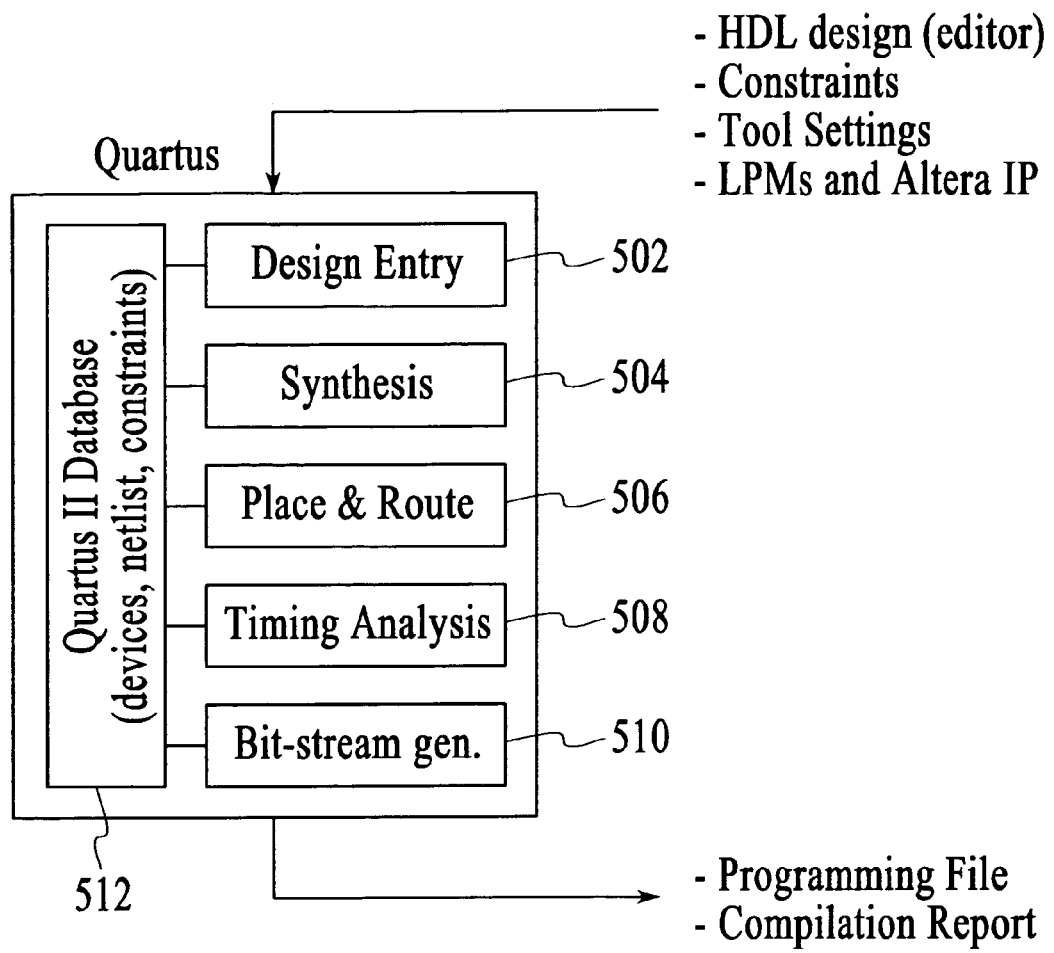
FIG. 5A shows a computer aided design (CAD) flow diagram.

FIG. 5A shows an example of a flow diagram of a electronic design automation (EDA) or computer-aided design (CAD) tool used in the design of integrated circuits including microprocessors, ASICS, memories, FPGAs, PLDs, and others. In a specific implementation, this flow is used to configure a programmable logic integrated circuit. As discussed above, a user typically programs a programmable logic integrated with the user's desired logic. FIG. 5A is an example of one technique of designing and implementing logic for a programmable logic integrated circuit. At Altera, a particular implementation of the technique of this flow is implemented using a software system referred to as Quartus. This is just an example, one could draw the flow with more or fewer steps and targeting a specific or more general device hardware. The most common implementation of this flow would be as a computer program executing as part of a system similar to that shown in FIG. 1, though other implementations are possible.

The steps of the flow include design entry 502, synthesis 504, place and route 506, timing analysis 508, and bit stream generation 510. Each of these steps in the process may access, store, or retrieve data from a database 512. The database may include devices, a netlist, and constraints.

Design Entry

Design entry is a step of a user specifying his design. Design entry may be performed by schematic capture, entering in logic gates and other logic symbols in a schematic editor. Other techniques of design entry include using a high level design language (HDL) editor. The design is input in a language such as VHDL or Verilog.

Synthesis

Synthesis is a process or method, typically implemented in a software program, for converting the input design from a high-level design language such as VHDL or Verilog into an optimized netlist of gates mapped into the target technology. In the case of programmable logic this often, but not always, includes 4-input lookup-tables (LUTs) and a D-type flip-flops (DFFs). There are many other details and differences not described here.

Synthesis can be either hard-coded as an algorithm, or controlled through a script. Though conceptually similar as a method of computation, the latter is common because it allows for more flexibility and also allows substitute scripts to be used as an option in the flow. The concept of a script for synthesis is largely due to the SIS synthesis system from Berkeley. For more information, see E. M. Sentovich, K. J. Singh, L. Lavagno, C. Moon, R. Murgai, A. Saldanha, H. Savoj, P. R. Stephan, R. K. Brayton, and A. L. Sangiovanni-Vincentelli, *SIS: A System for Sequential Circuit Synthesis*, Technical Report UCB/ERL M92/41, Electronics Research Lab, Univ. of California, Berkeley, Calif. 94720, May 1992.

There are many algorithms in synthesis. The following are some examples of algorithms that are available for calling in a typical synthesis system. A synthesis operation may be to remove redundant logic. Some techniques includes sweep, two-level minimizer, one-hot state machine minimizer, odc stuck feedbacks, odc combinatorial logic, odc secondary signals, reduce secondary signals, convert silly LUTs to logic, and remove redundant loop cuts. A synthesis operation may include restructuring and removing redundant logic. Some techniques include resynthesizing fan-out-free cones and resynthesizing cones through fan out. A synthesis operation may include restructuring. Some techniques include eliminate, factor sum-of-products, decompose to two inputs, widen, make sum-of-products, extract a load (i.e., asynchronous load) signals, and extract cubes. A synthesis operation may include removing duplicate or redundant combinational logic or registers, extracting common cubes, or XORs. A synthesis step in a CAD flow may include any combination or all of these operations, and may include other operations too.

In an implementation, technology mapping (or tech mapping) is part of synthesis, and generally comes at the end of synthesis. In an alternative implementation, tech mapping may be part of the place and route. Tech mapping converts the netlist into another which matches the logic structure of the target architecture. For example, for programmable logic, tech mapping converts the netlist into a format for the logic blocks, look-up tables, flip-flops, and other logical elements of the programmable logic architecture.

Table A below shows an example of a synthesis script.

TABLE A

| | |
|---|---|
| 1. | Minimize logic |
| | two-level minimizer, odc, remove duplicate logic, DFFs |
| 2. | Collapse to remove structure |
| | Eliminate |
| 3. | Minimize & add structure 1 |
| | Two-level minimizer, factor, resynthesize |
| 4. | Minimize & add structure 2 |
| | Two-level minimizer, factor, resynthesize |
| 5. | Extract duplicates |
| | Remove duplicate logic, DFFs, extract common cubes |

Place and Route

Place and route is a process or method of choosing individual physical locations on a chip, board or other physical hardware implementation for each cell in the netlist, and then performing the connections between them. Placement places cells of the netlist into the target hardware architecture. Routing performs physical wiring connections between cells. For the specific embodiment of programmable logic, this means determine which logic elements (and their look-up tables) implement particular functions and how the signals are routed using the interconnect, global and local.

Timing Analysis

Timing analysis determines the electrical or other delay and thus the performance or timing of the eventual hardware. For example, timing analysis evaluates the delays between registers and I/Os to determine the potential performance (i.e., speed) of the design. Using timing analysis, a user will have a good estimate as to the performance of his logic implemented in the integrated circuit (e.g., programmable logic). At this point, the design has not been implemented in the device, and the user can change the design as needed to obtain the performance the user desires. For example, if the speed path is not fast enough, he can made design changes and go though the CAD flow again. Design is sometimes an iterative process, where the user tries a design, sees the results using timing analysis, make changes to the design, and sees the results again. This process may be repeated many times as needed.

Bitstream Generation

The step of "bitstream generation" is specific to the example of FPGA or PLD devices which are programmed by a bitstream. In particular, the design is converted into a stream of bits that will be loaded into the FPGA or PLD device to configure it to the user's design. This step is optional since it is not needed for certain integrated circuits, such as ASICs (which are hard-programmed using masks or lasers instead of a bitstream).

Figure 5B:
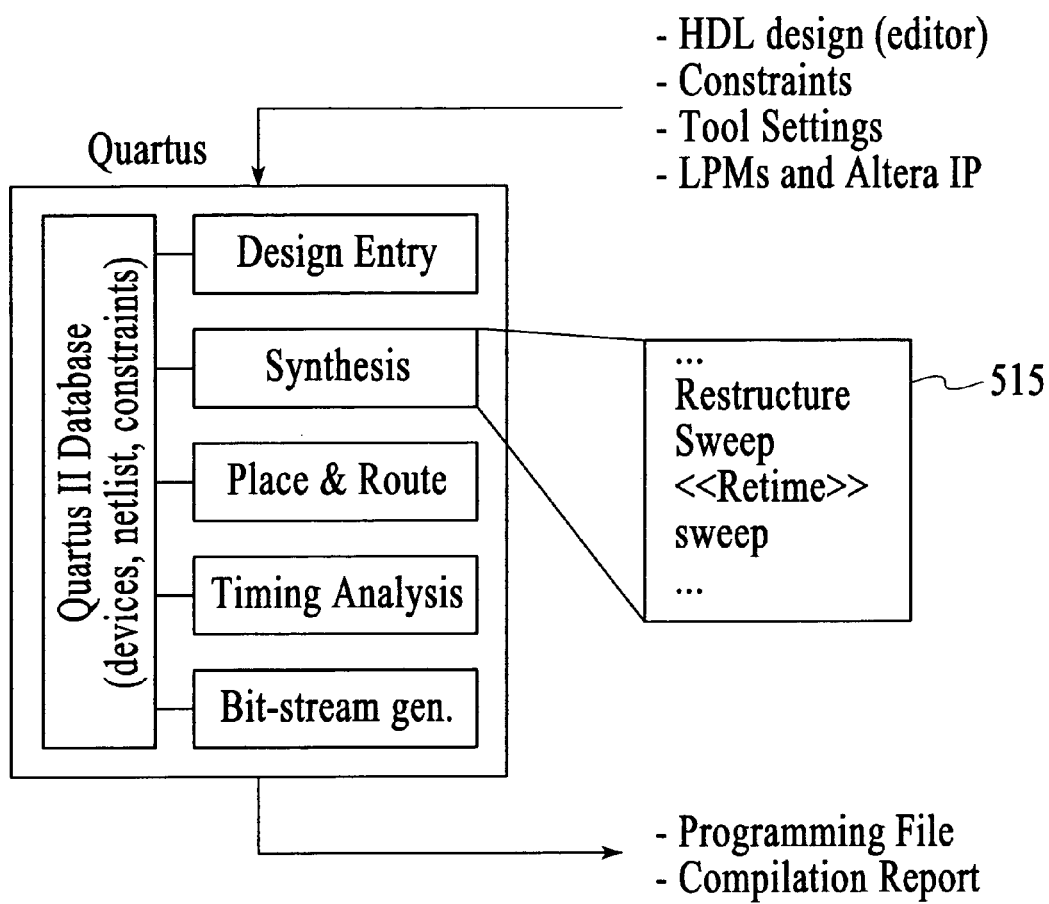
FIG. 5B shows a computer aided design flow diagram including a retiming algorithm.

Each of these steps above is commonly broken down into further steps. In an embodiment, the invention is a retiming technique and an additional algorithm that typically will be included in the synthesis portion of the flow. However, one could also implement a conceptually similar operation either at multiple different places in synthesis or also in later stages such as place and route. FIG. 5B illustrates a flow diagram of a technique of the invention where a retiming technique 515 is performed as part of the synthesis step of a CAD flow.

Register Retiming

A system of the invention performs register retiming. Register retiming is a synthesis operation in which registers are moved across combinational gates in a netlist in order to balance the delay on paths in the netlist, and hence minimize the length of the longest path. In other words, the technique is performed on the logic of integrated circuits to improve their performance. The technique is applicable in the design of many different types electronic circuits, including microprocessors, memories, gate arrays, ASICs, programmable logic, PLDs, FPGAs, and others.

In a specific embodiment, retiming is performed within the synthesis step of the CAD flow described above, and within the synthesis step, it is performed before tech mapping. In an embodiment, the invention adds a new algorithm "retiming" to the collection of algorithms shown in 5A. In the above paradigm of synthesis scripts (or in the hard-coded version), one could insert the retiming algorithm at multiple places in the script (see FIG. 5B). For the reasons discussed, it has been desirable to implement a retiming system, but there has been no practical implementation like the present invention. In an implementation, the specific algorithm provides features which allow this algorithm to simultaneously optimize any combination of the following items: (1) ability to handling of register power-up conditions; (2) ability to modify asynchronous signals in registers; (3) ability to avoid creating bad behavior in the resulting circuit due to issues such as but not limited to metastability; (4) ability to avoid unexpected or bad behavior in the resulting circuit by retiming between unrelated or other clock-domains existing in the same user circuit; (5) providing a user-specified mechanism (control, logic option) to prohibit certain types of retiming, honored in the algorithm; (6) providing a mechanism for creating such logic options in the netlist; and (7) ability to infer don't-touch conditions on specific other types of registers. The latter user don't-touch is particularly important to maintain the ability of the user to perform logic verification ("formal" verification or other) and simulation, and to protect registers which will at a later stage of the design creation need to be available by name.

Retiming is particularly important for programmable logic devices, because most programmable logic devices contain an abundance of flip-flop (register) resources. And often these registers are not used, especially in the case when only the combinatorial portion of a logic element is used. Thus, unlike ASIC flows which must create new registers as a by-product of retiming, the creation of registers is essentially "free" for programmable logic. Specifically, in a typical PLD or FPGA design, there are many unused or "free" registers. These registers may be utilized during the retiming procedure.

In the specific case for programmable logic, a computer system executing a register retiming algorithm of the invention may be used to improve performance of a user's logic to be programmed into a programmable logic device. The register retiming algorithm may be part of a system of designing or programming, or both, a programmable logic device or other integrated circuit. A definition of the user's logic may be provided to the system in a netlist or other computer-readable form. The system optimizes the user's logic to improve a speed path of the device, improving a maximum frequency (fmax or FMAX) of a design. The system provides as output an optimized version of the user's logic. This optimized version provides an equivalent functionality or the same functionality as the user's logic, but provides better performance. The user can indicate to the system whether to use the optimized version of the functionality or the user's originally submitted logic definition. Furthermore, the register retiming algorithm may be an optional part of a system of designing and programming a programmable logic device. For example, in a system for designing or programming, or both, a programmable logic device, the user may specify to run the register retiming algorithm, or specify that it is not run. It is a user-selectable option.

This invention provides a complete algorithm for retiming in programmable logic and FPGA-based designs, in which not only is the algorithmic problem solved, but it is done so efficiently, and with all of the pitfalls of retiming (e.g., long compile times, logic legality problems, difficulties with verification) properly addressed. As discussed above, the technique is applicable to other types of integrated circuits besides programmable logic and FPGAs including microprocessors, gate arrays, memories, and application specific integrated circuits (ASICs). This invention also addresses register retiming issues related to some additional problems such as register power-up-conditions or reset signals. This invention also provides retiming techniques specific addressing the designs representative of the type of complicated logic found in industrial FPGA designs.

This patent application discusses the classical retiming problem, some of the algorithmic solutions, and some of the often ignored drawbacks of retiming. A method of the invention is provided for gate-level retiming, and there is discussion on how to deal with the practical issues required in any realistic CAD flow. The method addresses legality issues (i.e., logic legality) such as metastability, and shows the effects that implementing these restrictions will have on the quality of results. The principles of the invention are also applicable to register retiming at other levels besides the gate level.

A measure of performance in a synchronous netlist is the longest delay of any register-to-register path in nanoseconds (ns) or, more commonly, 1000/(r2r) which gives the maximum clock-speed in megahertz at which the design can be implemented without forcing functional failure. The variable "r2r" refers to register-to-register delay. This measure of performance is called fmax or FMAX.

In a typical netlist, this worst case delay is not realized by all register-to-register paths, so an attractive option is to move registers across combinational gates or delay elements in order to balance the delays among all paths, and hence minimize the worst-case delay. Delay elements may include combinatorial gates, logic gates, AND, OR, NAND, NOR, INVERT, look-up tables, RAM, DSPs, and others.

Retiming Flow and Pseudocode

Table B below shows the top level pseudocode of an implementation of the retiming operation. Note that each clock domain is retimed separately, and that a sequence of optimization steps are used to complete the operation by fixing secondary signals and re-optimizing the netlist after retiming.

TABLE B

```
// Overview of the retiming function.
void retime( netlist )
{
    overall_success = false
    success = false;
    for( each clock )
```

TABLE B-continued

```
    {
        graph = build_retiming_graph(netlist, clock)
        set_tont_touch_flags(netlist) /* see detailed pseudocode */
        success = retime_clock_domain( clock );
        if (success)
        {
            apply_retiming_to_netlist(netlist, graph)
            overall_success = true
        }
    }
    if( overall_success )
    {
        minimize secondary signals
        minimize combinational logic
        remove duplicate registers
        fix secondary signals
        minimize & restructure logic
        remove duplicate logic
    }
}
```

In an implementation, retiming is performed for each clock domain separately. The operation of retiming a single clock domain is provided in retime_clock_domain( ) in the more detailed pseudocode provided in the appendix. One of the key items of this step is the addition of constraints for compatible registers. Compatible registers are those for which the same clock, clock-enable are used, and their asynchronous signals are active at the same time.

The method for applying these constraints with specific extensions for the use of asynchronous signals is new. The method is to add upper and lower bound constraints on the delays of edges in the retiming graph which are adjacent to gates with incompatible registers on their inputs. A high-level description is shown in table C below. For details see the appendix.

TABLE C

```
// Avoid merging of incompatible registers by setting lower bounds on
relevant edges. void set_constraints_for_compatible_registers
(netlist, clock, graph)
{
    virtually apply forward retiming in the netlist until
        no registers can be moved forward without merging
        incompatible registers
    for( each gate in the netlist that has a register on each of its
        fanins but the registers are incompatible )
    {
        node = graph node corresponding to gate
        lower_upper_bound( graph, current retiming of gate,
        infinity )
    }
}
void lower_upper_bound( graph, node, lower_bound, upper_bound )
{
    if( lower_bound != -infinity )
    {
        insert edge from node to host with w(edge) = lower_bound+1
    }
    if( upper_bound != infinity )
    {
        insert edge from host to node with w(edge) = upper_bound+1
    }
}
```

The modifications made to the graph by this routine changes the behavior of algorithms which come later in the flow. Even if the steps of the algorithm itself have not changed, the fact that we have modified the graph in this way changes the behavior of the algorithms and thus comprise a modified method.

The core retiming operation occurs on the retiming graph, with the just described modifications to enforce register compatibility. It consists of a forward pass to compute delays on the netlist, followed by binary search on the potential cycle times in which a feasibility of a solution with the given cycle time is determined.

This is shown in detail in the routine retime_graph( ) in the appendix. The key subroutines of this algorithm is retime_graph_for_cycle_time_with_forward_delays (graph, current_cycle_time) and retime_graph_for_cycle_time_with_backward_delays (graph, current_cycle_time), which are provided in the appendix. These are called with four different variations which were determined empirically, and the best result for both area and delay is chosen. After each of these steps, we first normalize the retiming to guarantee that the host node (artificially added to enforce the constraints in set_constraints_for_compatible_register( )) requires no retiming registers. This is documented in normalize_retiming( ) in the appendix.

The core algorithm for retiming with backward delays is shown in table D below with some detail removed. See the appendix for full details and for the forward analog.

TABLE D

```
// Apply retiming for the given cycle time with backward delay
computation. bool retime_graph_for_cycle_time_with_backward_
delays( graph, cycle_time )
{
    backward_compute_delays( graph );
    // Go through at most n-1 iterations or feasibility is determined.
    for( iter = 0; iter < n-1 && changed && legal_retiming; ++iter )
    {
        // Forward retime each node with delay more than cycle_time
        changed = false;
        for( i = 0; i < n; ++i )
        {
            node = node(i)
            if( delay(node) > cycle_time )
            {
                r(node) = r(node)-1;
                changed = true;
                // Bookkeeping mechanism for efficiency.
                pred_vec[node] = other_node for which other_
                node is the
                    end node of the path from node with delay =
                    delay(node);
            }
        }
        // Speed-up
        if( pred_vec contains a cycle )
        {
            legal_retiming = false;
        }
        compute new edge weights
        backward_compute_delays(graph);
    }
    Determine legal_retiming by checking for nodes which violate
    cycle_time. return legal_retiming;
}
```

Finally the retiming is applied to the netlist. This is done with a novel and efficient method. We create a stack upon which all backward-retimed nodes that have registers on each fan out are first placed in a single pass through the graph. For each node on the stack, backward retiming is applied until either it is enough retimed or there are no more registers on it's fan outs. Then each fan-in node of the node is pushed on the stack if and only if all fan outs of the node have a register and the node needs to be backward retimed. By utilizing the stack in this way we can guarantee correctness of the algorithm, and avoid any quadratic blow-up in the work required to apply retiming operations recursively.

The same method is applied in the reverse direction to apply the forward retiming moves to the original netlist. Further details are provided in the appendix.

Figure 8:
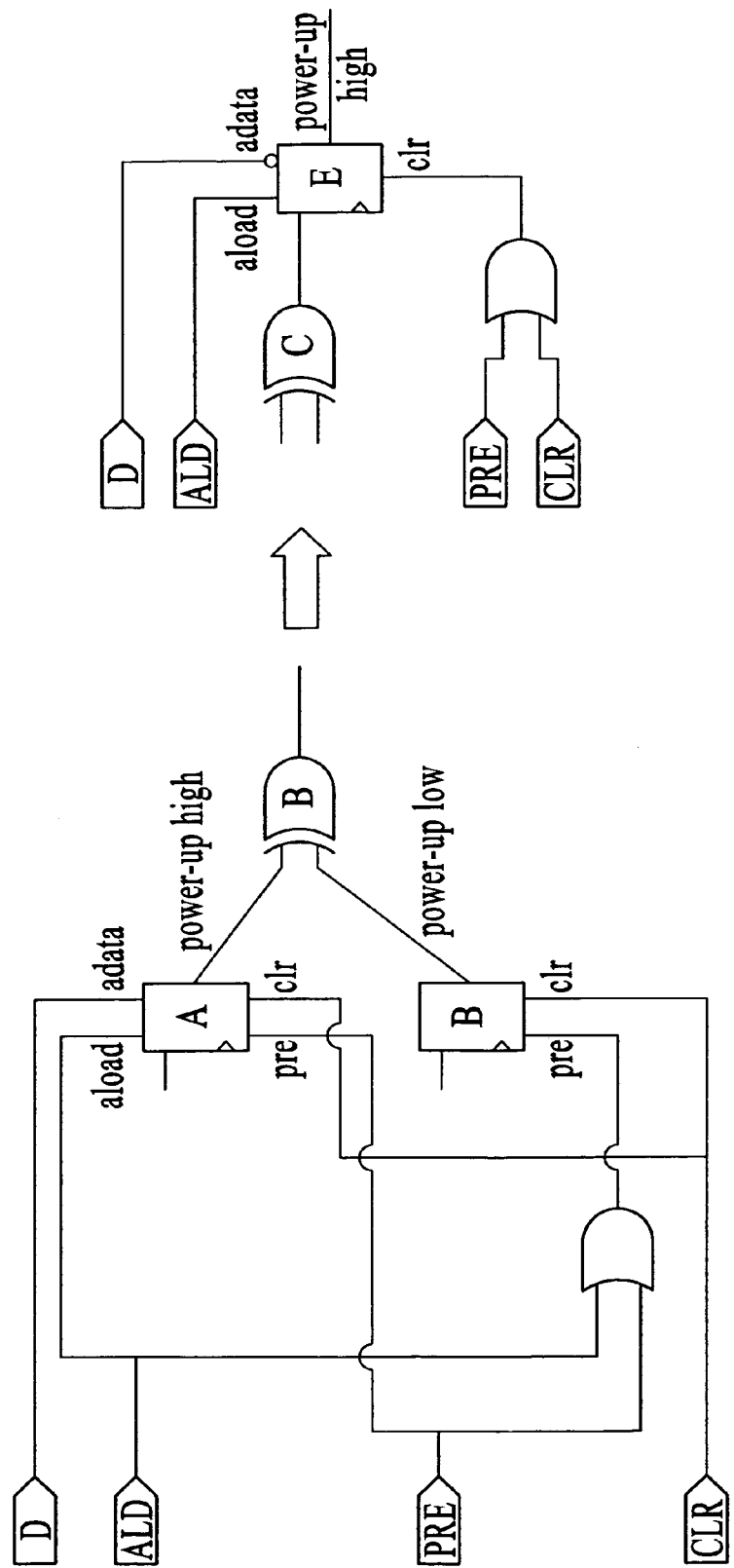
FIG. 8 shows forward retiming with asynchronous secondary signals, when two registers are compatible.
Figure 9:
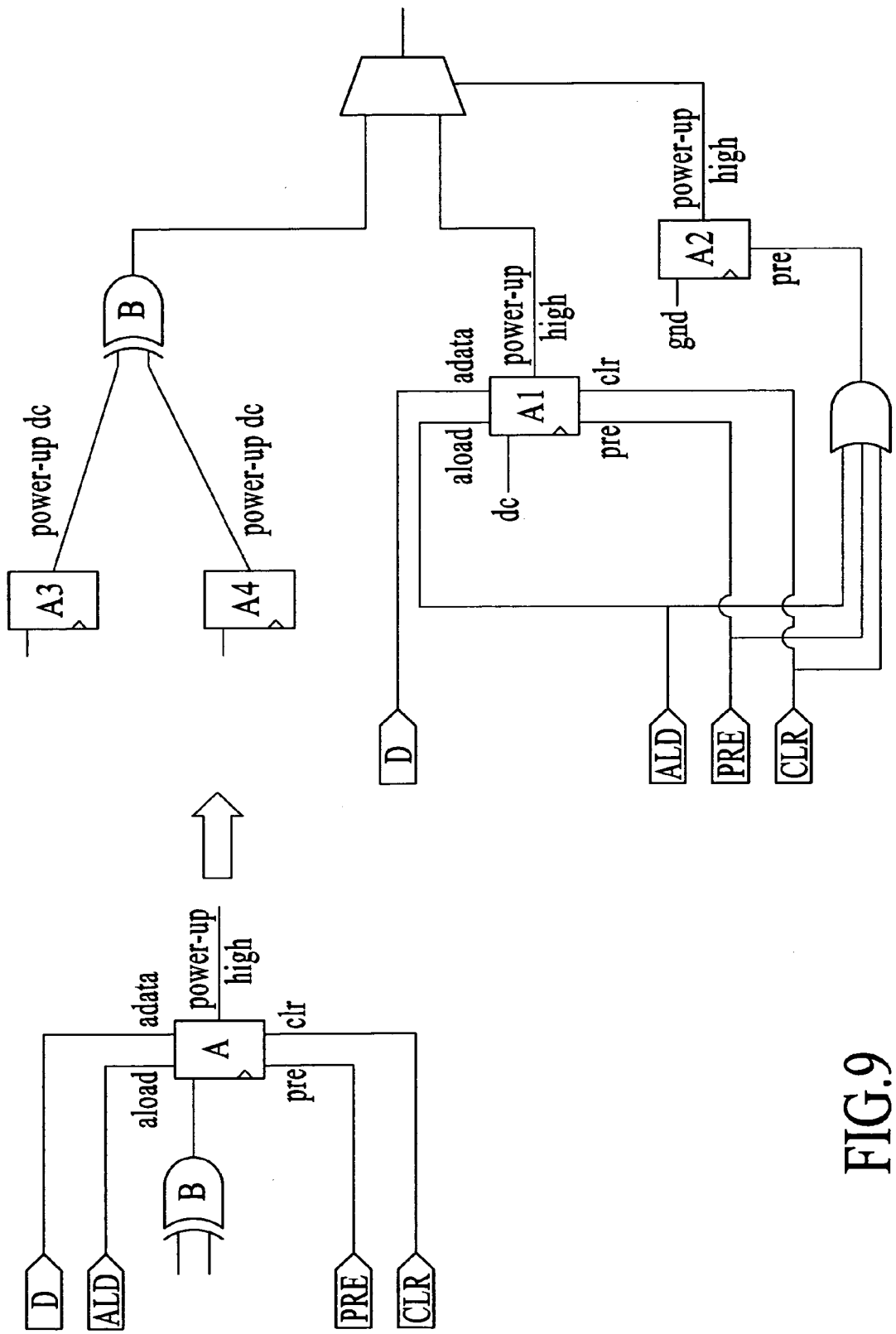
FIG. 9 shows fixing asynchronous secondary signals in backward retiming.

A key item in the application of the retiming graph to the original netlist is the new routine backward_retime_node( ) which fixes all asynchronous delays appropriately when moving registers. The forward analog is also provided in the appendix, but is less complex. These operatively are shown in FIGS. 8 and 9.

There are many possible implementations of a retiming algorithm and any of these implementations may be used. For example, in a specific implementation, retiming is executed at the end of synthesis processing, and before technology mapping. In an alternate embodiment, retiming may be moved to after technology mapping. Some other ways of using the retiming algorithm would include at the beginning of placement, at the end of placement and during placement. In such an embodiment, the algorithm may be modified so it will operate more optimally when used at such a point in the processing.

Retiming Operation

Figure 6A:
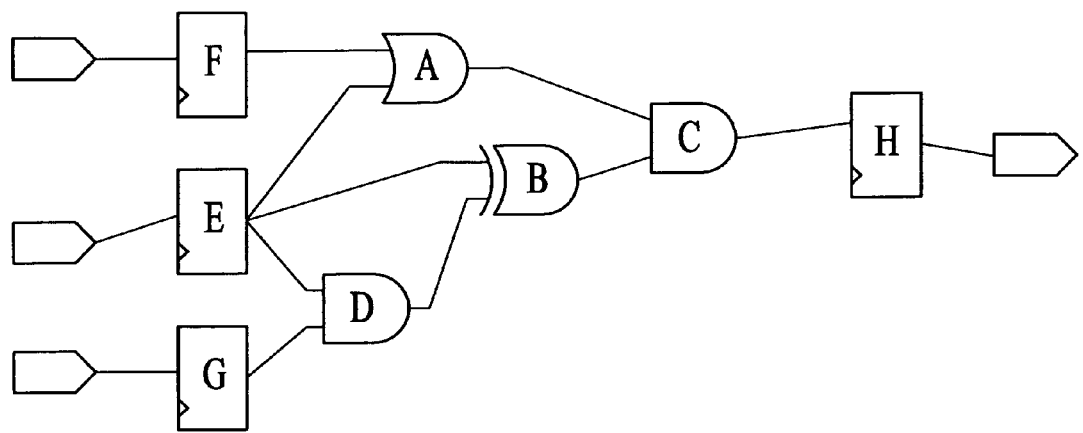
FIG. 6A shows a netlist with logic depth three.
Figure 6B:
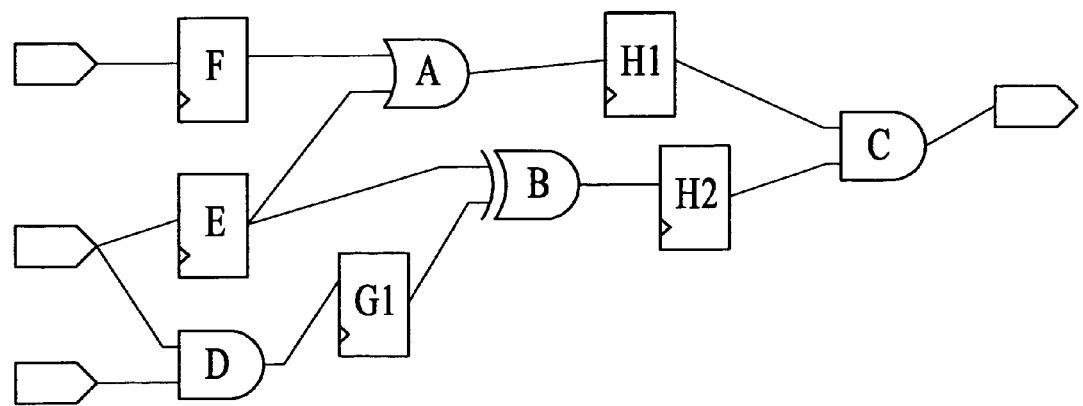
FIG. 6B shows the netlist of FIG. 6A after retiming where logic depth is reduced to one.

As an example of an application of retiming, a simplified diagram of a retiming operation is shown in FIG. 6A and FIG. 6B. FIG. 6A shows a graph in which the worst-case register-to-register depth is three, with a pin-to-register and a register-to-pin depth of zero (clock signals are not drawn, all registers are assumed to have the same clock). Depths are measured in gates. By register retiming, one can balance the lengths of the combinational paths and make the input-to-register, register-to-register and register-to-output depths all equal to one. FIG. 6B shows the result of this. Register H from FIG. 5 is moved backwards over gate C, resulting in two new registers H1 and H2. Register E is duplicated: the original is feeding A and B, the duplicate is feeding gate D. The duplicate of E and register G are moved forward over gate D, resulting in register G1.

The retiming problem can be modeled as follows. Given is a directed graph $G=(V, E)$. Each node v has a nonnegative node delay $d(v)$, and each edge e has a nonnegative integer weight $w(e)$, which represents the number of registers on this edge. A retiming of a graph is a function r that maps each node to an integer $r(v)$. The retimed weight $wr(e)$ of an edge $e=(u,v)$ is $w(e)+r(v)-r(u)$. A retiming is legal if the retimed weights of all edges are nonnegative. The delay of a node in the graph G with retiming r is defined to be $Dr(v)=d(v)+\max\{Dr(u)|(u,v)$ in E and $wr(u,v)=0\}$. The graph delay or clock period is the maximum of $Dr(v)$ over all nodes.

Given a graph $G=(V,E)$ with weights and node delays, the objective of the retiming problem is to find a retiming r such that the clock period is minimum.

Table E below provides pseudocode for a dynamic programming algorithm based on Bellman-Ford that finds a retiming for a given target clock period c, if it exists. Further discussion on dynamic programming and Bellman-Ford may be found in C. E. Leiserson and J. B. Saxe, "Retiming Synchronous Circuitry," *Algorithmica*, 1991.

TABLE E

```
ComputeRetiming(G)
set r(v) = 0 for each node v
for i = 0 to |V|−1
    ComputeDelays(G,r)
    for each node v with D_r(v) > c
        increment r(v) by 1
ComputeDelays(G,r)
if any node has D_r(v) > c
    there is no feasible retiming for c.
```

Table F provides a function ComputeDelays(G,r) to compute the delays Dr in the graph for the given retiming with dynamic programming and Bellman-Ford.

TABLE F

```
ComputeDelays(G,r)
set D_r(v) = 0 for each node v
for i = 0 to |V|−1
    for each edge e=(u,v) with w(e)+r(v)−r(u)=0
        D_r(v) = max(D_r(v), D_r(u)+d(v))
    Stop if none of the delays have changed
```

More specifically, if after $|V|$ (i.e., size of V) iterations, $Dr(v)$ still changes, this means that the graph contains a positive cycle, and there is no solution. In this case, the algorithm takes $O(|V||E|)$ time (i.e., refers to an algorithm where the solution is $O(f(n))$. In this case, the algorithm is an order of $n^2$. A disadvantage of this approach is it may take significant computer time, especially for large or complex designs. The algorithm may be sped-up to make the worst-case runtime $O(c|E|)$ time, where c is the length of the smallest cycle with positive delay, and similar a speed-up may be made to the retiming algorithm.

Given this algorithm, an optimum clock period retiming of a graph can be found by applying binary-search on all the possible clock periods. As an upper bound for the retiming, one can take the delay of the graph before retiming.

A problem of a minimum area retiming under delay constraints should be addressed. This is the problem where one is trying to find a retiming with a minimum number of registers for a given target clock period. This problem is also solvable in polynomial time, although the naïve algorithm is very inefficient in practice. There may be more efficient implementations of this algorithm.

Another problem in retiming is the initial state problem: each register in the circuit has an initial state or power-up condition which may be high, low, or don't care. This is the value that the register has at power-up of the circuit. When moving registers around in the circuit, these initial states have to be preserved, i.e., the input and output behavior has to be exactly the same. When moving registers forward in the circuit (i.e., from inputs to outputs), preserving the power-up state is possible, because the initial state of the new register can be computed by simulating the gate through which the register has been moved forward. However, when moving registers backwards in the circuit, initial state computation is harder, and sometimes even may be impossible. A problem of computing initial states for the retimed circuit is NP-hard, which means it is computationally inefficient. Although this problem may be solvable heuristically, most algorithms are too inefficient and complicated to apply in a practical environment When mapping for look-up table (LUT) based FPGAs, applying retiming before mapping to LUTs does not guarantee optimal LUT depth. Retiming on LUTs after mapping however, also does not give optimal LUT depth. An algorithm simultaneously maps simple gates to LUTs and applies retiming. This algorithm ensures optimal LUT depth, but is very complicated and computationally expensive. Runtime improvements of the algorithm are possible. Area minimization may be considered. The algorithm may also be extended to incorporate initial state computation.

In typical circuits, there are multiple different clock domains, and registers have secondary signals like clock enables, asynchronous clears, and so forth. An efficient algorithm to compute upper and lower bounds on the retiming of nodes that assures that any retiming satisfying these bounds will be legal with respect to the clock enables and reset signals.

To overcome a problem of the lack of estimates of interconnect delay, one technique is to apply retiming during clustering and partitioning, during placement, or in physical synthesis.

There are a number of "pitfalls" in retiming which are rarely considered. The method of the invention provides a solution to a retiming that does take these pitfalls into account. For example, the method of the invention handles multiple clock-domains and secondary signals (e.g., aload, clear) that introduce the notion of compatible registers. These are a particular issue for FPGAs, which often contain interface logic with different clock domains. Other considerations include the interaction with user constraints—e.g., a don't touch designation is critical for any serious design in which the designer needs to maintain internal registers for debug purposes—and restrictions on retiming to avoid metastability and cross clock domain problems. This discussion will refer to the latter to as legality issues in retiming. Power-up conditions are handled, and the invention handles all the topics necessary for a production quality system simultaneously.

In an embodiment of the invention, retiming is implemented as a separate algorithm from technology mapping that runs on netlists consisting mostly of simple gates and LUTs. This means it can still be run anywhere during logic minimization or even after technology mapping. However, in other embodiments of the invention, retiming and technology mapping may be combined into a single algorithm.

Input to Retiming

Input to a retiming algorithm of the invention is a netlist typically consisting of the following gates. These gates are representative of those typically found in programmable logic.

1. Simple gates. Mostly AND, OR and XOR gates with unlimited number of inputs and possibly inversions on the inputs. Also includes LUTs which have a limited number of inputs (e.g., at most 4 inputs or any number of inputs) and one output and can implement an arbitrary function.

2. Input/output pins.

3. Registers. Each register has a clock input and a data input. Furthermore it may have an asynchronous preset, asynchronous clear, and/or asynchronous load with corresponding data. Each register also has a power-up condition which can be high, low, or don't care.

4. Miscellaneous. All other gates in the netlist: mostly RAM, DSP blocks, blocks of mapped logic cells, buffers denoting "hard" logic cells, and logic cells that are part of a carry chain.

A goal of retiming is to move registers around in the netlist such that, after technology mapping, placement and routing, each clock in the design runs at the highest possible speed (i.e., fmax). Since visibility of placement and routing during synthesis is relatively imprecise, in a specific embodiment, the method of the invention uses a delay model that takes no placement and routing into account. This delay model is mostly unit-delay, with some special delays for LUT gates and miscellaneous gates like carries for which there is a fast connection on the chip. Even though the depth may not correlate well to a final fmax, improving depth in general makes a final fmax better on average. Hence, a goal of the retiming algorithm is to move registers around such that for each clock domain, a clock period after retiming of that clock domain is optimal with respect to the delay model (though evaluation will use a final place and route fmax).

A very important constraint for the algorithm is that the netlist after retiming is functionally equivalent to the netlist before retiming. Another important constraint is that the area does not increase too much by retiming. The main reason for this is that smaller chips are cheaper and faster. Furthermore, less area for the same depth usually gives better fmax, because there is more flexibility in placement and routing. Other than the area constraint, there are some usability constraints that prevent movement of some registers and that disallow movement of registers over certain gates (e.g., RAM, carry chains). Some more issues are discussed below.

Specific Implementation of Retiming

In a specific embodiment, a register retiming method of the invention includes the following steps. A method of the invention may include any number of these steps, and in any combination or order. Furthermore, two or more of the steps may be combined into a single step.

1. Build a retiming graph from the relevant part of the netlist.

2. Find an optimum clock period retiming in the graph, satisfying the given constraints.

3. Apply the obtained retiming to the netlist.

Because the choice of the algorithm in step 2 is important for how to model the retiming graph, the discussion on this step is presented first. After that discussion, step 1 and step 3 will be discussed. This is also a discussion of the flow.

As said before, an important consideration for the method is that it should be fast. To find the best possible cycle time, the register retiming method of the invention applies a binary search on the cycle time: the lower bound is the maximum pin-to-pin delay (since a pin-to-pin path without registers cannot be retimed), and the upper bound is the current clock period.

When an optimal clock period is found, the method finds a retiming for this clocks period that keeps the area increase under control. The method tries to minimize the number of register moves, because this is a good approach to control area. Especially backward moves have a potential to increase area, because they may introduce extra logic (see below). Therefore, the method finds a retiming in which as few backward moves as possible are needed. One method applies a Bellman-Ford in reverse, so a maximum $r(v)$ for any node v is minimized. However, in the present approach, the method seeks to minimize a sum $\{r(v)|r(v) \text{ is positive}\}$.

As it turns out, this heuristic works very well when no backward moves are necessary, because it will guarantee that none will take place. However, when backward moves are needed, the algorithm usually gives a solution which needs more backward moves then the original algorithm.

In order to address this shortcoming, the present invention computes an optimum clock period retiming with four different algorithms: (1) the original algorithm, (2) the reverse algorithm, (3) the original algorithm, then set retiming to zero for all nodes with $r(v)<0$, and apply reverse algorithm starting with this partial solution, and (4) start with the reverse algorithm, then set $r(v)$ to zero for all nodes with $r(v)>0$ and apply original algorithm starting with this partial solution. From these four algorithms, the one is chosen that gives the best value for $\text{sum}\{-r(v)*w1|r(v)<0\}+\text{sum}\{r(v)*w2|r(v)>0\}$, where w1 and w2 are weights given to forward and backward moves, respectively.

The retiming graph has to model the gates and interconnections that are involved in the retiming, but also all possible restrictions that need to be satisfied. Retiming is run per clock domain. For a given clock domain, registers are determined which will be involved, and search from these registers to find and mark all the combinational logic that is connected to these registers. The method stops at so-called hard boundaries like pins, RAM blocks, registers from other clock domains, and so forth. With this information the method builds the retiming graph for the current clock domain. Carry-chains are modeled properly, but the method doesn't retime into them.

Figure 7:
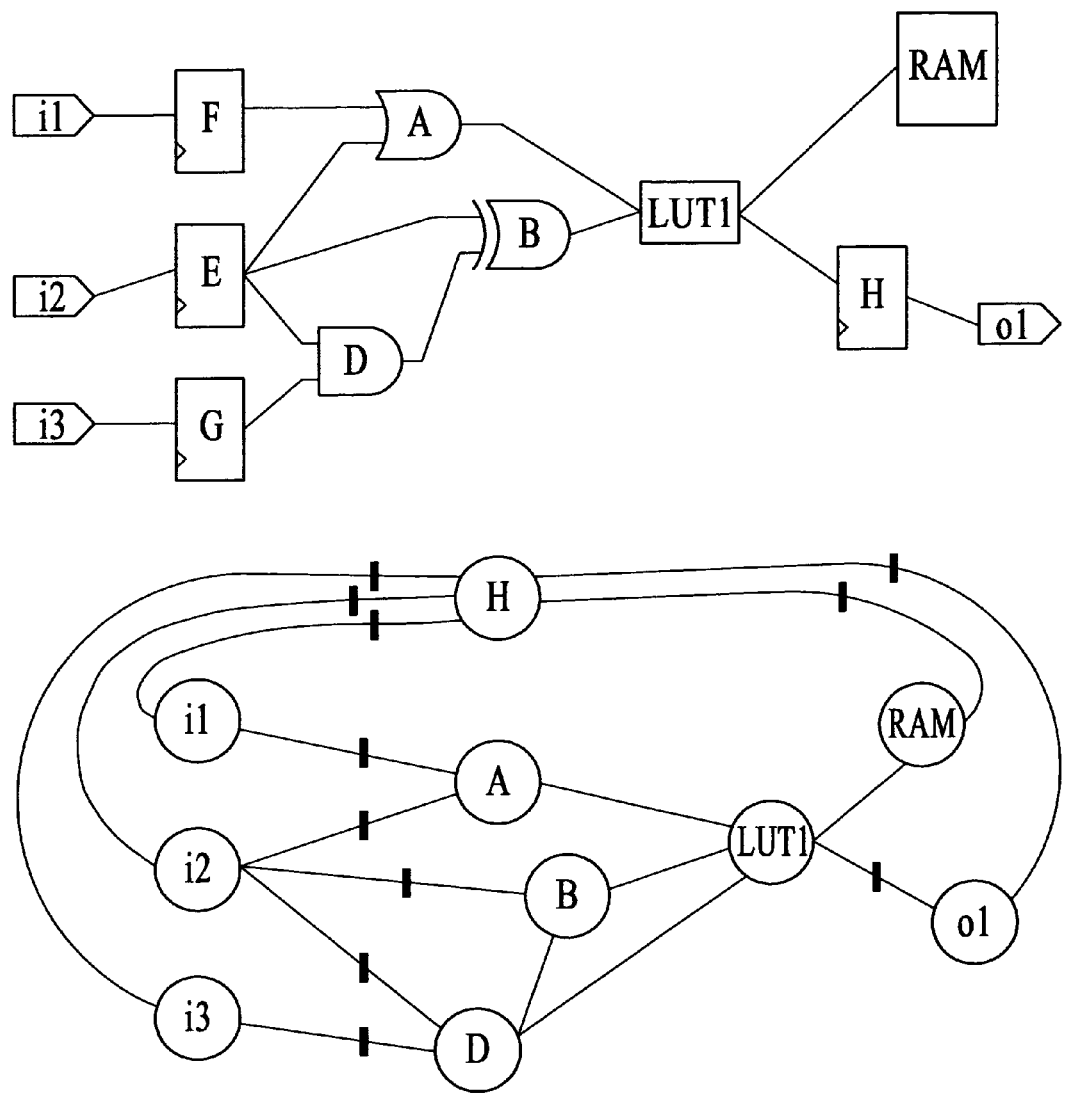
FIG. 7 shows a netlist and its retiming graph.

The graph will include input nodes, output nodes, and internal nodes. For each combinational gate (e.g., simple, look-up table (LUT), or complete logic cell) that was marked in the search, the method creates an internal node in the graph. For each hard boundary gate that was met in the search, the method creates an input or an output node, or both, in the graph, depending on whether it feeds or is fed by combinational logic that needs to be included in the graph. For each two nodes u and v in the graph, there is an edge from u to v for every path through only registers from the gate corresponding to u to the gate corresponding to v. The weight of this edge equals the number of registers on the path. FIG. 7 shows how a netlist is translated into a retiming graph. Clock and secondary signals of the registers are ignored. The solid bars in the graph denote registers: the number of bars on an edge equals its weight. The existence of node H is explained below.

Because of the algorithm used, the method should to be able to move registers from output pins to input pins and vice versa in the retiming graph, even though this is not legal in the circuit. After having found a final retiming, the method will fix it in such a way that input and output nodes all have r(v)=0 (i.e., no registers are moved into or out of the circuit). This is modeled as follows. The method creates a host node H. H has an outgoing edge to each input node and an incoming edge from each output node. Both the outgoing and the incoming edges have weight one. The delay of node H equals the current target clock period. It can be verified that in this way, any feasible retiming can always be changed into a feasible retiming with the same clock period in which the host node and the input and output nodes all have r(v)=0.

Upper and lower bounds on retiming numbers of nodes are implemented by adding extra edges to the retiming graph. For instance, if we are allowed to move at most k registers forward over a certain gate, we set a lower bound on the retiming number r(u) for the corresponding node u by adding an edge from H to u with weight k+1. In the same way we can create an upper bound k on r(u) by adding an edge from u to H with weight k+1. If a certain register is not allowed to be moved at all, we simply consider it as a hard boundary and make it both an input and an output node of the graph.

Given a gate and a register on each of its inputs, the method can only apply forward retiming if the registers on its inputs are "compatible." Two registers are defined to be compatible if and only if they have the same clock enable, their asynchronous signals are triggered at the same time, and furthermore, if both registers have an asynchronous load, they load the same data. The latter condition is not necessary, but it makes sure we never need extra logic on the asynchronous data signal. If the registers on the inputs of a gate are compatible, we can move them through the gate and compute the asynchronous signals and power-up state of the new register by simulating the gate. FIG. 8 and table G below show an example of this for forward retiming through an XOR gate. Table G gives a table of rules for simulating the asynchronous signals for the netlist in FIG. 8.

TABLE G

| Signal | A | B | C |
|---|---|---|---|
| Power-up | 1 | 0 | 1 |
| CLR | 0 | 0 | 0 |
| PRE | 1 | 1 | 0 |
| ALD | D | 1 | D' |

The method does not try to move incompatible registers forward over a gate. This is done for clock enables and resets, and is generalized to combinations of asynchronous secondary signals. In particular, each register is given a class, which basically consists of a clock enable, a list of signals that trigger asynchronous events, and the asynchronous data signal if it exists. Two classes are compatible if they have the same clock enable, the same list of asynchronous trigger signals, and either the same asynchronous data or one has no asynchronous data. Note that compatibility is not an equivalence relation.

Initially when building the retiming graph, each edge (u,v) is given a list of classes of registers that is formed as follows. Suppose when walking on the path from u to v in the netlist, the methods meets registers r1, r2, ..., m in this order. Then the class list on the edge (u,v) will be (c(r1),c(r2), ...,c(m)), where c(ri) is the class of ri. With these class lists the method computes a so-called maximal forward retiming of the graph, by applying forward retiming as much as possible, but only moving registers forward over a node when all involved registers are compatible. The class lists are adapted during the forward moves. When no changes can be made anymore, a maximum forward retiming of the graph has been found. For each node in the graph that has incoming edges with positive weight, but can not be forward retimed anymore because the registers are incompatible, the method set the current retiming number as a lower bound on the node.

After having set the bounds found in the maximum forward retiming, the class lists are removed from the edges, the retiming is reset to 0, and the building of the retiming graph is completed. Note that this method may sometimes be over-restrictive. For instance, if in FIG. 8, both registers had the same asynchronous load with corresponding data, then the resulting register after forward retiming would not have an asynchronous load. However, in our maximal forward retiming the new register class will have the asynchronous load.

For backward retiming, the same thing may be done, but this is not strictly necessary because it will be possible to insert extra logic to fix the problem of incompatible registers. We found that it would be too limiting to forbid backwards moves of incompatible registers. Besides, the amount of extra logic created for incompatible registers turned out to be sufficiently low.

When the final retiming is found in the retiming graph, it has to be applied to the netlist. Note that at this point we assume the given retiming has r(v)=0 for the host node and all input and output nodes. The retiming is applied to the netlist by moving registers over gates one by one. First the forward retiming is applied to all nodes with the following algorithm in table H.

TABLE H

```
ForwardRetimeGraph(G,r)
    for each v in V do
        if r(v) < 0 and w(e)>0 ∀e=(u,v)∈E
            push v on stack
    while stack not empty do
        pop v from stack
        while r(v) < 0 and w(e)>0 ∀ e=(u,v)∈E do
            ForwardRetime(v)
            r(v) = r(v)+1
            for each e=(u,v) ∈ E
                w(e)=w(e)−1
            for each e=(v,u) ∈ E
                w(e)=w(e)+1
            if r(u)<0 and w(e')>0 ∀e'=(x,u)∈E
                push u on stack.
```

ForwardRetime(v) forward-retimes the gate in the netlist that corresponds to node v. It applies simulation to compute the power-up state and asynchronous secondary signals of the new register that is placed on the output of the gate. See also FIG. 8 and table G.

When the forward retiming algorithm is completed, it is guaranteed that r(u)>=0 for all nodes u in the graph. After this, backward retiming is applied in the same way. Like procedure ForwardRetime, there is also a procedure BackwardRetime that applies backwards retiming to a gate in the netlist. This function is different from the forward retiming, because it may encounter incompatible registers and furthermore, it is not always possible to compute new power-up states and asynchronous secondary signals after moving registers backwards through a gate. The procedure to fix all this goes as follows.

Handling Power-Up

Given a gate that needs to be backward retimed, the method first removes the inversions on the data-input of the registers the gate fans out to. This is done by pushing the inversion through the register to its output. The power-up states and asynchronous secondary signals have to be adapted to maintain the same functionality: the power-up setting is changed from high to low or vice versa: power-up is inverted, the asynchronous preset and clear signals are swapped, and the data that goes with the asynchronous load is inverted. After this is done, duplicate registers on different fan outs of the gate are merged into one. When this is done and the gate still fans out to more than one register, the gate is duplicated such that each copy has fan out to only one of the registers. All duplicates of the gate will be backward retimed.

At this stage, the gate to be retimed fans out to only one, noninverted, register. To backward retime the gate, this register is removed from the fan out and registers are inserted at each of the fan ins of the gates. If the gate is an AND or OR gate, the new registers get the same power-up setting and asynchronous signals as the original register. It can easily be verified that this gives the equivalent or same functionality for this gate. If the gate is an XOR or LUT however, setting the same power-up and asynchronous signals would not necessarily give the equivalent or same functionality. For instance, if the original register had a preset signal and the gate is a 2-input XOR, then setting the same preset on both registers will make the output of the XOR go low when preset is high. To fix this, different preset and clear signals are not set on the new registers. Instead, both registers are given power-up don't care and no asynchronous secondaries. Then at the fan out of the gate, some extra logic and registers are inserted to fix the problem. See FIG. 9 for an example. To minimize area overhead, this is only done when one would have gotten the wrong results by copying the original asynchronous secondaries and power-up states.

To handle the power-up situation, where certain registers are power-up to particular states as a user selects, the retiming algorithm of the invention handles moving these register backwards or forwards, if needed. This aspect of the invention would also apply to registers which has specific initial conditions, perhaps user selected. For example, particular registers may be initialized to a logic 0, logic 1, or a don't care X.

With the approach of the present invention, it is always possible to determine the new power-up conditions for the new registers (i.e., those new registers resulting from moving a register having specific initial or power-up conditions). But the approach possibly requires new gates or logic to be inserted in order to maintain the same or equivalent functionality in the resulting circuit.

For forward retiming, new gates are not required to make an equivalent function. Depending on the particular case, new gates may be used. In a specific implementation, when performing forward retiming, the technique performs a simulation to determine the new power-up value. Simulation refers to building a truth table of the old register and function and then creating a new register and function having the same or equivalent truth table.

Backward retiming is handled as follows:

1. For AND and OR gates, which are straightforward, a specific approach of the invention sets the same or equivalent power-up value and asynchronous secondary signals for the new registers.

2. For NOT gates, the approach does the same as explained for AND and OR gates. However, all are inverted. Therefore, clear becomes preset, preset becomes clear, and the data and power-up conditions are inverted on the new registers.

3. For XOR and LUT, the new registers are given power-up don't care and no synchronous secondary signals, and then additional gates are added as shown in FIG. 9 which multiplex in with the result of the gate which used to have the register, possibly then removing any of these gates which are not required because of unused secondary signals.

Note that in a specific implementation of the invention, gates more complicated than the ones described above, such as carry chain outputs, DSP blocks, and other, will be excluded from retiming. However, despite being excluded, the above approach would work as long as they were combinational gates.

In an embodiment of the invention, the retiming algorithm is run before technology mapping, because at that time we have mostly simple gates in a netlist (some LUTs may exist in this netlist). This is good for retiming for two reasons. First, it gives more potential places in the netlist that a register can be moved to. Second, in backward retiming, it does not require as much extra logic to fix power-up states and asynchronous secondary signals.

Retiming may be run in several stages of the technology independent synthesis, and in a particular implementation, retiming was run at the end of technology independent synthesis. This is because at the end, the best visibility of the depth of the final mapping occurs at this point, which leads to better results. Experiments showed that at this point in time, the depth of the netlist in simple 2-input gates is approximately twice the depth of the final mapping in 4-input lookup tables. Before running retiming all simple gates are decomposed into 2-input gates, using an algorithm such as DMIG, which finds a decomposition that guarantees optimal gate depth. However, in other implementations, retiming may be run at other stages. Further discussion on DMIG may be found in J. Cong, Y. Y. Hwang, "Structural Gate-Decomposition for Depth-Optimal Technology Mapping in LUT-Based FPGA Design." In *Proc. Design Automation Conference* (DAC) 1996.

The retiming algorithm is run for each clock domain separately. After retiming is finished, a clean-up function is run that makes sure all power-up states and asynchronous secondary signals are legal for the current device. Some of the devices for instance have no preset, so it is not necessary to push a not-gate through the register to change the preset into the clear. Also most devices have no power-up high available for internal registers.

After the clean-up step, some more technology independent logic minimization steps are run. The most important of these is the removal of duplicate registers and gates, because especially the backward retiming steps may introduce many duplicates. Some more minimization steps help to remove redundant logic that was introduced by the register moves.

Design Conditions on Retiming

There are many issues that make it dangerous or illegal to move certain registers in a design. Some of these issues are listed below. A method of the invention may include one or more of the following design considerations or design conditions, in any combination. Any number or all may be included in a specific embodiment of the invention. These may be options enabled or disabled by the user.

1. Registers fed by unrelated clock domains. Registers in a design may be fed by registers in other clock domains, either directly or through combinational logic. When the clock domains are unrelated, it is dangerous to duplicate the register that is fed by the other clock domain: after duplicating it, the two registers may clock in different data at the same clock edge, because they see the data at slightly different times, or because of clock skew. Problems like this are hard to discover for designers. Note that, when clocks are related, this problem does not occur, because timing analysis and timing simulation will point out any problems that occur. The present method will disallow moves of any registers that are fed by registers in a different, unrelated clock domain. The method does the same for registers that are fed directly by input pins, because these pins may be fed by other, unrelated, clock domains elsewhere on the board.

When a register is fed by a different clock domain, it may go in a metastable condition if glitches occur in the data when the clock goes high. To make sure that meta-stable registers don't feed other logic on the chip, the data that comes from the unrelated clock domain is often fed through a sequence of two registers with the same clock, before feeding other logic. Even though the first register in the sequence can go meta-stable because of glitches in the data, the probability that the second register does this as well is very small. It is clear that if these synchronization registers are moved away from each other, the absence of meta-stability cannot be guaranteed anymore. Therefore we do not allow moves of these registers. Since we cannot detect whether two registers in a sequence are meant to be synchronization registers or not, we simple assume that they are whenever the first register is directly fed by an input pin, or fed by registers in another, unrelated clock domain.

2. Input/output registers. Registers that are directly fed by a pin or directly feeding a pin, are often there on purpose, so that the designer gets deterministic I/O timing. Therefore, the method does not move these registers. A pin is an input, output, or input/output pin of the integrated circuit. An example of this is a pin feeding an input of a register. The register should not be moved during retiming.

3. Registers feeding asynchronous signals on other registers. Duplicating these registers may result in glitches in the asynchronous signal, which may result in unexpected values on the register. Therefore the method does not move registers that feed asynchronous signals on other registers. The method does allow movement of registers that feed clock-enables, because these usually use cluster-wide signals (i.e., Altera's Stratix contains clusters called LABs which share global control signals) that have built-in glitch suppression.

One example of this situation is a first register feeding a clear input of a second register. The first register should not be moved during retiming. Examples of asynchronous signals are clear and preset and an asynchronous load.

4. Registers feeding registers in another clock domain. To be safe this registers are not moved either. An example of this is a first register clocked using a first clock signal and a second register clocked using a second clock signal. An output of final register connects to the second register through some combinational logic. The first and second registers should not be moved.

Since the default setting of a software implementation of the software may be potentially overrestrictive on some of the above assumptions and rules, the user has the ability to override any rule by setting a logic option on the register when they know the retiming is safe.

The restrictions described above give retiming less flexibility in moving registers around. The most limiting restriction is not allowing to move output registers. Many designs need to be backward retimed to obtain the optimal clock period.

A problem that occurs when too many registers cannot be moved is that, at some point in the retiming algorithm, the delay-critical path in the retiming graph is formed by a zero-weight path between two hard boundaries (input and output nodes in the graph). Since these paths cannot be improved by retiming in any way, they were limiting the retiming. This problem may partly be solved by removing all edges from the retiming graph that were not on any path with an edge with positive weight (i.e., a movable register). The idea behind this is to ignore the critical path that cannot be retimed, and instead concentrate on the next critical path. In this way it may seem to optimize the wrong path, because it is not the critical path. However, the method does improve near-critical paths, thus giving placement and routing an easier job because there are less near-critical paths. And this can help fmax.

5. Timing constraints. Designers can put timing constraints on individual registers. For instance, they can put a multicycle constraint from register A to B, meaning that B only clocks in the data from A once every so many cycles. When two registers feeding a gate have different multicycle constraints, these registers cannot just be moved forward over the gate and merged, because that would violate the multicycle constraint. This means the method needs to make sure that registers are only merged if they have compatible timing constraints. This should be done both for forward and backward retiming. In another implementation, the method simply disallows movement of registers with individual timing assignments on them. This may sound very limiting but it could in fact be a good thing, because if registers have individual timing assignments like multicycle constraints, just looking at node-delay may be totally wrong for improving fmax.

6. Simulation. The retimed netlist will have the same input/output behavior as the netlist before retiming. This means that simulation on input and output pins will not give any problems. But it may be impossible to simulate registers in the netlist, because the retimed registers will have different functionality than the original registers. Similar problems occur when using signal-tap (i.e., hardware debug macros supported by the tool) to probe internal nodes.

The latter issue is supported essentially through user logic-options such as don't-touch which can be assigned to named registers in the design, and by outputting a detailed report on registers created and removed by retiming. By using don't touch, this also permits retiming to be used in conjunction with third-party verification tools, which would otherwise be a problem if they only do static verification of combinational or combinatorial logic.

In a specific implementation, the following design conditions are used. Automatically infer a "don't touch" when the "always allow" option is not set and at least one of the following conditions holds:

1. Register directly fed by pin.
2. Register directly fed by another register in same clock domain that satisfies the item above.
3. Register directly feeding pin.
4. Register feeding asynchronous signals (e.g., asynchronous load or aload, asynchronous clock or aload and others) on other registers directly or through combinational logic.
5. Register fed by register in other clock domain directly or through combinational logic.
6. Resister directly fed by other register in same clock domain that satisfies the item above.
7. Register feeding register in other clock domain directly or through combinational logic.
8. Resister with "never allow" set.
9. Resister involved in timing assignment other than global fmax, tsu, or tco.
10. Resister directly fed by DATA.OUT of SERDES receiver.
11. Resister directly feeding DATA.IN of SERDES transmitter.
12. If "allow trade-off . . ." is off: registers that are fed by an input pin (or bidirectional pin) through combinational logic.
13. If "allow trade-off . . ." is off: registers that feed an output pin (or bidirectional pin) through combinational logic.

Any one or number of the above design conditions, in any combination, may be handled and used in a particular implementation of the invention.

Heuristic Retiming Algorithm

In testing an implementation of the register retiming method of the invention, the designs used for some experiments are between 12,000 and 56,000 4-LUT+DFF logic elements, and include multiple types of RAM and DSP blocks (dedicated multiply/accumulate hardware). The size of the retiming graph ranges up to 210,000 nodes (gates) in the largest case.

A geometric mean improvement in fmax from our retiming algorithm is about 5 percent. Though the average improvement is about 5 percent, the results are roughly split between winners and losers or ties, with 39 winners gaining 10.2 percent, 13 ties with no effect, and 15 losers giving up 3.9 percent fmax.

Based on the inventors' observations, designs that have already been well pipelined by the user, and designs which are well-written in general have less to gain from retiming.

Designs in the prototype stage, or which have not been analyzed completely tend to get significant gains from retiming.

This patent application provides a complete technique for retiming. The algorithm effectively solves fundamental problems such as area degradation and compile time, and also correctly handles of power-up conditions, multiple clock domains, secondary signals, and legality. The invention has uses concept of compatible registers for retiming and provides guidelines on unsafe register moves. The retiming algorithm achieves performance improvements in fmax with a negligible effect on compile time and area.

User Interface

Figure 10:
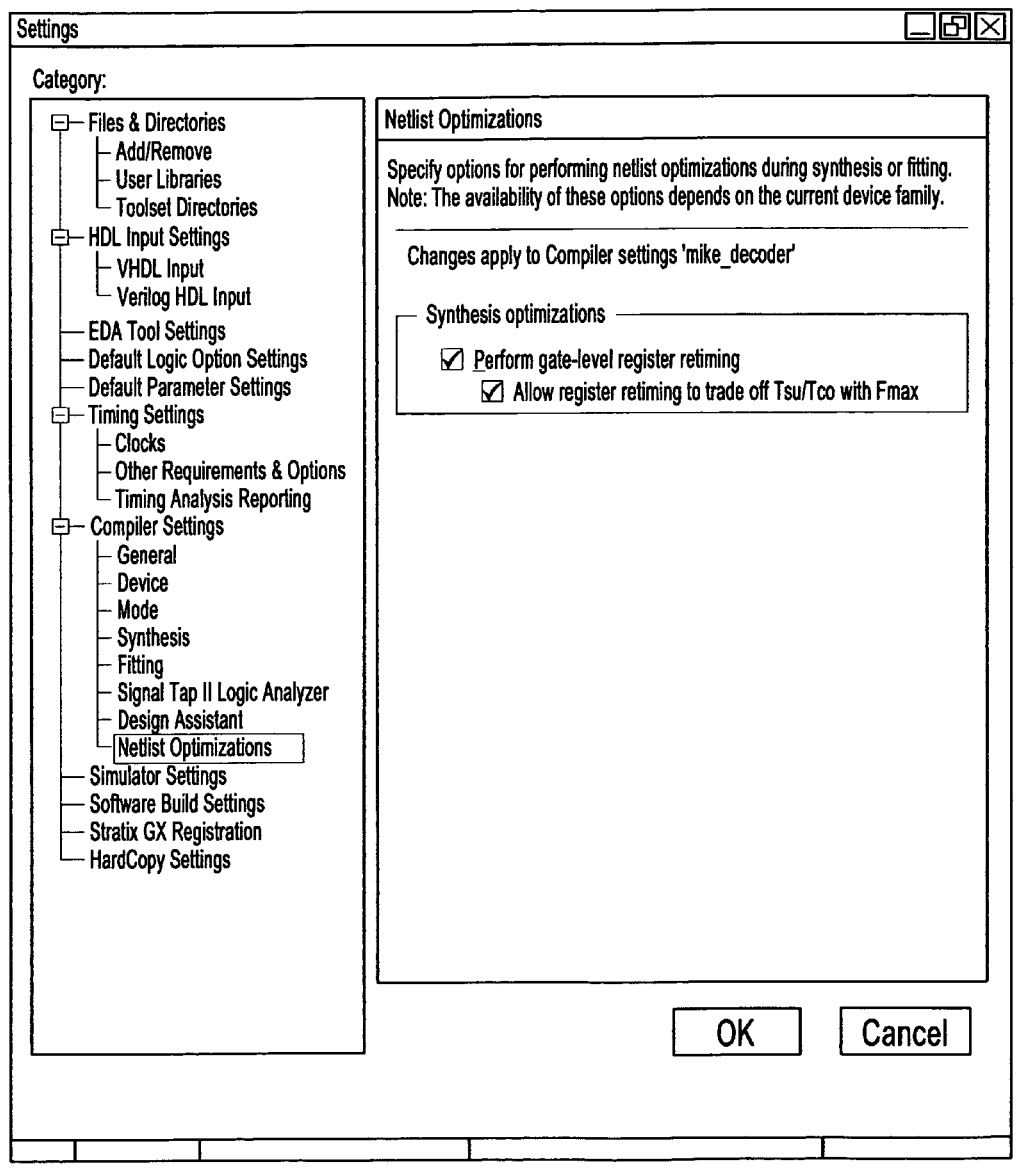
FIG. 10 shows a user interface for optimization options available during synthesis.

FIG. 10 shows an example of a user interface for a computer-implementation of a retiming technique of the invention. In particular, this is a settings dialog for a CAD tool implementing retiming per this method, with subsettings to allow the method to trade-off TSU and TCO path timing with fmax (register-to-register) timing. Note the options are organized in a hierarchical tree fashion in a panel on the left side of the screen. A user may select any of these using a pointer device such as a mouse. In the menu, "netlist optimizations" is selected and is highlighted. On the "netlist optimizations" menu, the options are "perform gate-level register retiming" and "allow register retiming to trade off Tsu/Tco with Fmax," which are selected or not selected using checkboxes. When checked, the option is selected, and when unchecked, the option is not selected. These options control whether the indicated synthesis optimizations are performed.

Figure 11:
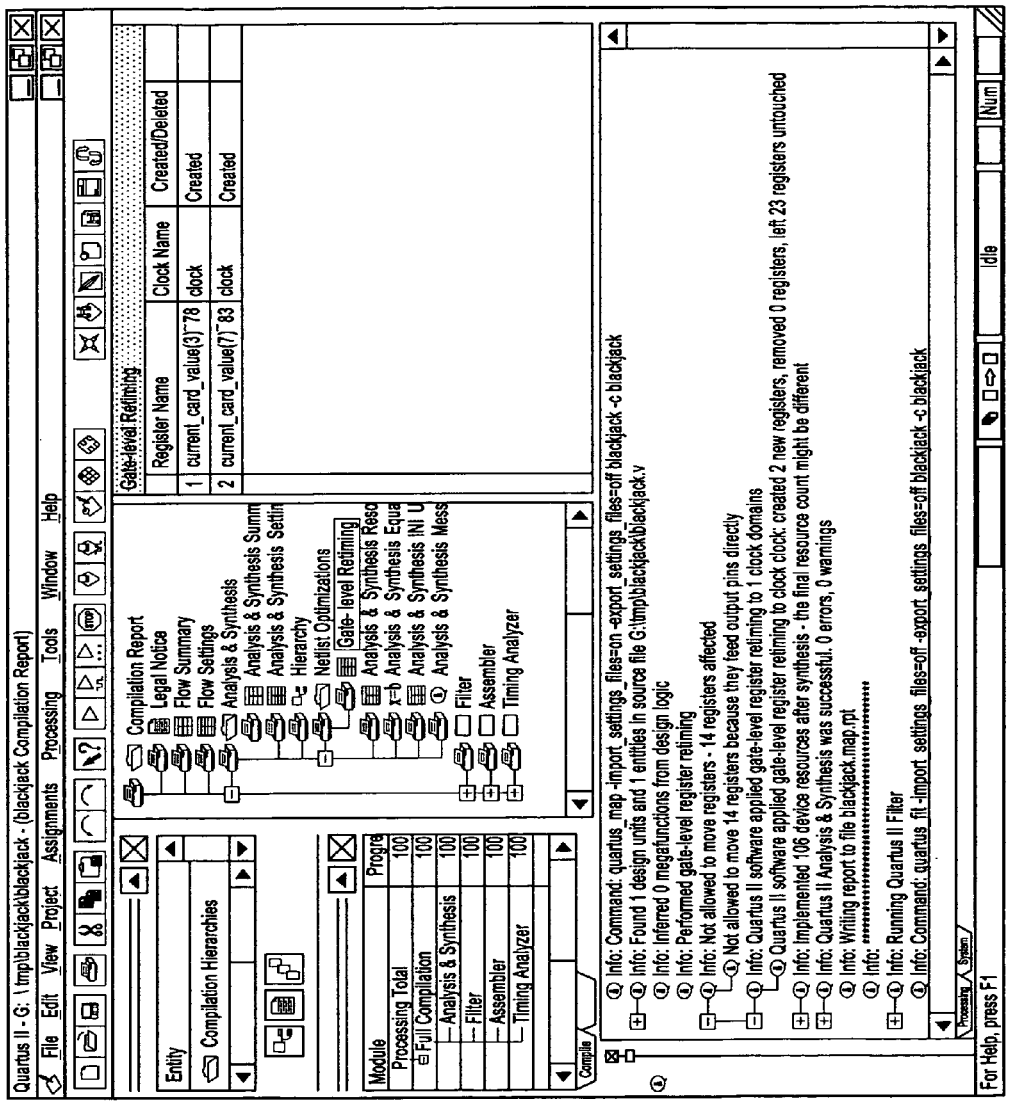
FIG. 11 shows a user interface for output of a gate-level retiming operation and a table of registers affected by the retiming operation.

FIG. 11 shows another example of a user interface screen. This screen shows a report from a CAD tool implementing the method. The user interface shows operation of retiming, effect of forbidden register moves (fourteen registers fed by pins), and summary panel showing names or labels of affected registers.

Figure 12:
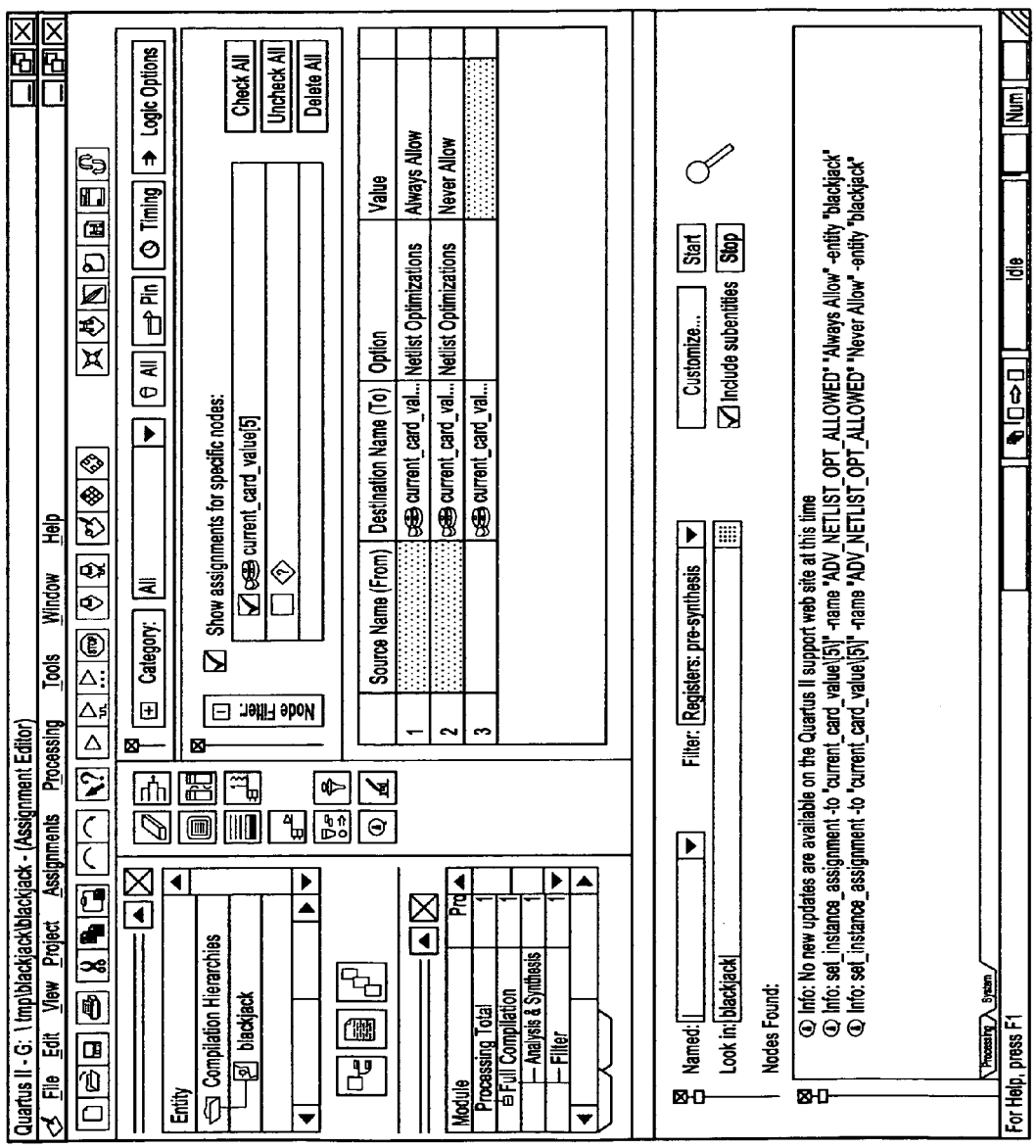
FIG. 12 shows a user interface which permits a user to specify logic options.

FIG. 12 shows another example of a user interface screen. This screen shows an implementation of a method allowing the software user to specify logic options to always allow retiming (netlist optimizations), overriding a default which does not allow it, and to forbid retiming (netlist optimizations), overriding a default which does allow it, for different nodes (registers).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A method executing in a computer-aided logic design system for designing logic circuitry wherein the method performs register retiming by moving a register in a logic design across one or more delay elements of the logic design, the method comprising:

providing a logic design file incorporating the logic design in computer readable format;

finding in the logic design a design condition that disallows register retiming; and disallowing moving one or more registers when performing register retiming when the design condition is met, wherein the design condition is replaced with a first register where a user has indicated as "don't touch."

2. The method of claim 1, further comprising permitting a user to assign the "don't touch" indication on one or more registers of the logic design.

3. A method executing in a computer-aided logic design system for designing logic circuitry, wherein the method performs register retiming by moving a register in a logic design across one or more delay elements of the logic design, the method comprising:

providing a logic design file incorporating the logic design in computer readable format;

finding in the logic design a design condition that disallows register retiming;

disallowing moving one or more registers when performing register retiming when the design condition is met; and permitting a user to selectively move one or more registers designated as non-movable.

4. The method of claim 3, wherein permitting a user to selectively move one or more registers comprises, along input paths, permitting the user to select between clock setup time (TSU), or clock-to-output delay (TCO), or maximum clock frequency (FMAX) when moving the registers.

5. The method of claim 3, wherein permitting a user to selectively move one or more registers comprises permitting a user to selectively allow register retiming along output paths.

6. The method of claim 3, further comprising permitting a user to selectively allow register retiming on asynchronous paths.

* * * * *